United States Patent  
Mochida

(10) Patent No.: US 8,923,227 B2  
(45) Date of Patent: Dec. 30, 2014

(54) WIRELESS COMMUNICATION APPARATUS USING AN ESTIMATE OF THE AMOUNT-OF-PHASE ROTATION USING PILOT SIGNALS

(75) Inventor: Eiji Mochida, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 57 days.

(21) Appl. No.: 13/501,804

(22) PCT Filed: Oct. 26, 2010

(86) PCT No.: PCT/JP2010/068950  
§ 371 (c)(1),  
(2), (4) Date: Apr. 13, 2012

(87) PCT Pub. No.: WO2011/052575  
PCT Pub. Date: May 5, 2011

(65) Prior Publication Data  
US 2012/0201221 A1 Aug. 9, 2012

(30) Foreign Application Priority Data

Oct. 26, 2009 (JP) ................................. 2009-245337  
Nov. 5, 2009 (JP) ................................. 2009-253972  
Nov. 5, 2009 (JP) ................................. 2009-254020

(51) Int. Cl.  
*H04W 4/00* (2009.01)  
*H04L 27/26* (2006.01)  
(Continued)

(52) U.S. Cl.  
CPC ............ *H04B 7/0842* (2013.01); *H04L 27/265* (2013.01); *H04L 2025/03426* (2013.01);  
(Continued)

(58) Field of Classification Search  
CPC ............... H04B 7/0854; H04B 7/0842; H04L 25/0232; H04L 25/03019; H04L 27/265; H04L 27/2672; H04L 27/2663; H04L 27/2675; H04L 2025/03426; H04L 2025/03598; H04W 72/04; H04W 27/2695  
USPC ......... 370/203, 285, 329, 341, 344, 503, 516; 375/285, 296, 3, 340  
See application file for complete search history.

(56) References Cited

U.S. PATENT DOCUMENTS 6,034,564 A * 3/2000 Iwamatsu ..................... 329/306  
6,493,397 B1 * 12/2002 Takahashi et al. ............ 375/285  
(Continued)

FOREIGN PATENT DOCUMENTS

JP 2000-36801 2/2000  
JP 2001-69117 3/2001  
(Continued)

OTHER PUBLICATIONS

Mitsuru Hirakawa et al., "Development of Interference Cancellation Method using Adaptive Array Antenna for Uplink OFDMA in Mobile WiMAX," Vehicular Technology Conference, 2009, VTC Spring 2009, IEEE 69th, Apr. 26-29, 2009, pp. 1-5.

(Continued)

*Primary Examiner* — Dang Ton  
*Assistant Examiner* — Ivan O Latorre  
(74) *Attorney, Agent, or Firm* — Drinker Biddle & Reath LLP

(57) ABSTRACT

A decrease in weight calculation accuracy in MMSE combining caused by a shift in the discrete Fourier transform timing of received signals is prevented. A wireless communication apparatus BS1 includes an MMSE combining processing unit 31 that performs MMSE combining based on frequency domain received signals obtained by performing a discrete Fourier transform on received signals. The wireless communication apparatus BS1 includes an amount-of-phase-rotation estimating unit 32 that estimates an amount of phase rotation occurring in the frequency domain received signals due to a shift in discrete Fourier transform timing of the received signals; and reverse rotation units 33a and 33b that apply a reverse rotation of an amount of rotation corresponding to the amount of phase rotation estimated by the amount-of-phase-rotation estimating unit 32, to the frequency domain received signals. The MMSE combining processing unit 31 computes an MMSE weight based on the frequency domain received signals to which the reverse rotation has been applied by the reverse rotation units 33a and 33b, and performs MMSE combining.

7 Claims, 26 Drawing Sheets

(51) Int. Cl.
   *H04B 7/08* (2006.01)
   *H04L 25/02* (2006.01)
   *H04W 72/04* (2009.01)
   *H04L 25/03* (2006.01)

(52) U.S. Cl.
   CPC .......... *H04L 25/0232* (2013.01); *H04W 72/04* (2013.01); *H04B 7/0854* (2013.01); *H04L 25/03019* (2013.01); *H04L 2025/03598* (2013.01); *H04L 27/2663* (2013.01); *H04L 27/2672* (2013.01); *H04L 2025/03414* (2013.01); *H04L 27/2675* (2013.01); *H04L 27/2695* (2013.01)
   USPC .......................... 370/329; 370/344; 375/340

(56) References Cited

U.S. PATENT DOCUMENTS

| | | | |
|---|---|---|---|
| 7,668,076 | B2 | 2/2010 | Yoshida et al. |
| 8,155,252 | B2 | 4/2012 | Piirainen et al. |
| 2002/0163977 | A1* | 11/2002 | Kobayakawa ............... 375/296 |
| 2003/0035469 | A1* | 2/2003 | Frank et al. ................. 375/150 |
| 2004/0005010 | A1* | 1/2004 | He et al. ..................... 375/260 |
| 2006/0221808 | A1* | 10/2006 | Shirakata et al. ........... 370/203 |
| 2009/0125793 | A1* | 5/2009 | Kishigami et al. .......... 714/794 |
| 2009/0296638 | A1 | 12/2009 | Kimura et al. |
| 2010/0157909 | A1 | 6/2010 | Miura et al. |
| 2010/0177697 | A1 | 7/2010 | Tanno et al. |
| 2011/0158180 | A1 | 6/2011 | Melis et al. |
| 2011/0286412 | A1 | 11/2011 | Mochida et al. |

FOREIGN PATENT DOCUMENTS

| | | | | |
|---|---|---|---|---|
| JP | | 2004-254290 | 9/2004 | |
| JP | | 2005-184730 | 7/2005 | |
| JP | | 2006-295727 | 10/2006 | |
| JP | | 2007-96468 | 4/2007 | |
| JP | | 2007-158424 | 6/2007 | |
| JP | | 2007-306131 | 11/2007 | |
| JP | | 2008-154223 | 7/2008 | |
| JP | | 2008-154244 A | 7/2008 | |
| JP | | 2008-167387 | 7/2008 | |
| JP | | 2008-178044 | 7/2008 | |
| JP | | 2009118404 | * 5/2009 | ............ H04J 11/00 |
| JP | | 2009-200602 | 9/2009 | |
| JP | | 2010-278599 | 12/2010 | |
| WO | | 2006/138206 | 12/2006 | |
| WO | | 2007/119280 | 10/2007 | |
| WO | | 2008/032358 | 3/2008 | |
| WO | | 2008/090764 | 7/2008 | |
| WO | WO 2008/096591 | | * 8/2008 | ............ H04J 11/00 |
| WO | | 2009/060894 | 5/2009 | |
| WO | | 2010/053019 | 5/2010 | |

OTHER PUBLICATIONS

Takashi Yamamoto et al., "A Study on Weight Update Method of Adaptive Array Antenna in Mobile WiMAX Antenna System," Proceedings of the 2007 IEICE General Conference Kiso•Kyokai, Mar. 7, 2007, p. 168, A-5-13.

Takashi Yamamoto et al., "A Study on Symbol Timing and Carrier Frequency Synchronization Methods in Mobile WiMAX System," Proceedings of the 2008 IEICE General Conference Kiso•Kyokai, Mar. 5, 2008, p. 158, A-5-31.

Tetsushi Abe et al., "Matched Filter Approximation of a Space-Time SC/MMSE MIMO Turbo Equalizer," Proceedings of the 2002 IEICE General Conference Tsushin 1, Mar. 7, 2002, p. 667, B-5-216.

Nobuyuki Kikuma, "Adaptive Signal Processing Using Array Antenna," $1^{st}$ edition, Kagaku Gijutsu Shuppan, Inc., Nov. 1998.

International Preliminary Report on Patentability of co-pending International application No. PCT/JP2009/06837 issued Jul. 7, 2011 (7 pages).

Shubair, R.M., "Robust adaptive beamforming using LMS algorithm with SMI initialization," Antennas and Propagation Society International Symposium, 2005 IEEE, vol. 4A, no., pp. 2, 5, Jul. 3-8, 2005.

* cited by examiner

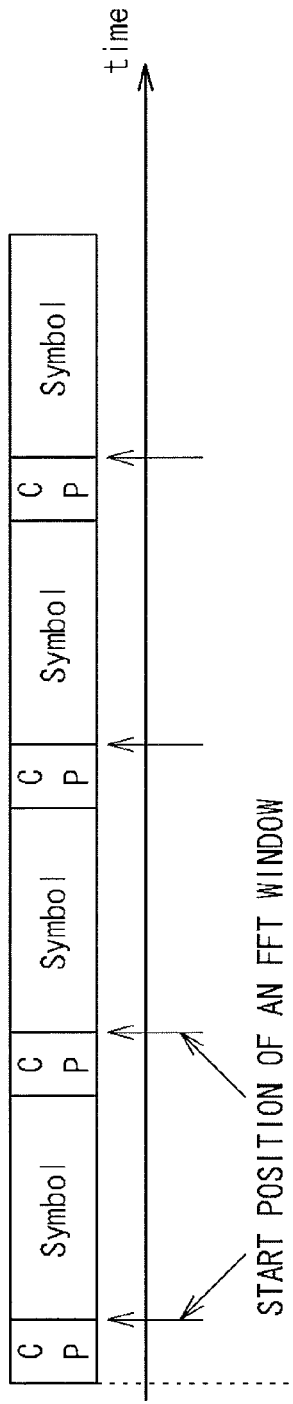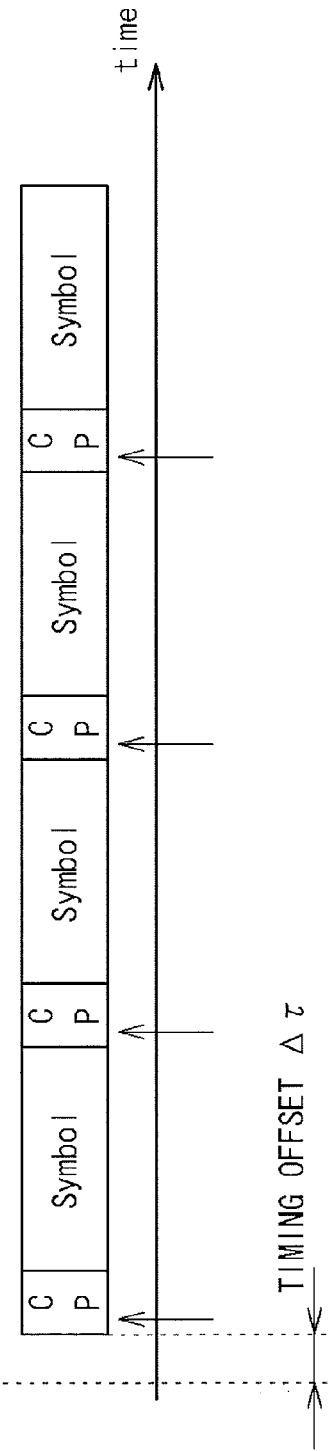

$\times e^{j2\pi \Delta f \cdot \Delta \tau}$
$(\equiv e^{j\Delta\theta})$ ←----- AMOUNT OF PHASE ROTATION FOR EACH SUBCARRIER

RESOURCE BLOCK

AMOUNT OF PHASE ROTATION CAUSED BY TIMING OFFSET Δθ

REVERSE ROTATION

RESOURCE BLOCK $\times e^{j2\pi \Delta f \cdot \Delta \tau}$
$(\equiv e^{j\Delta\theta})$

REVERSE ROTATION

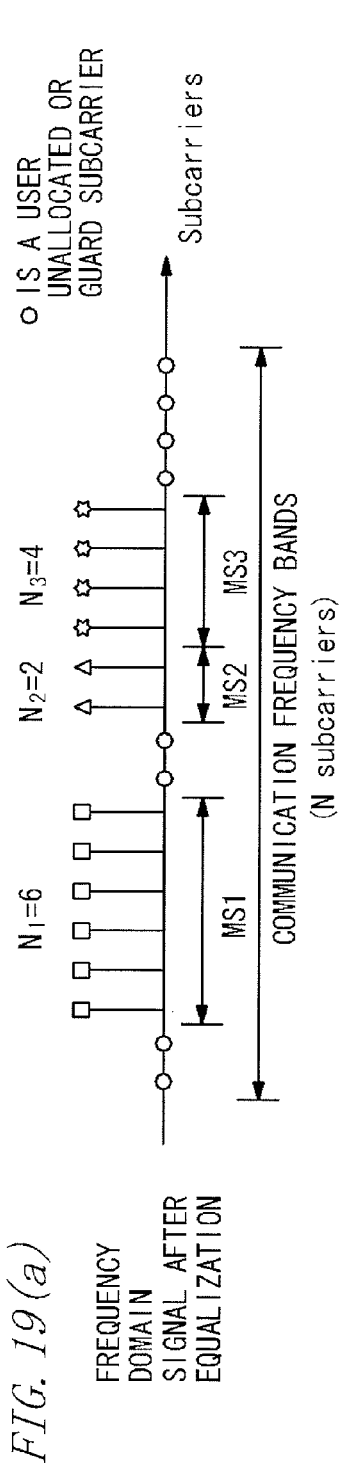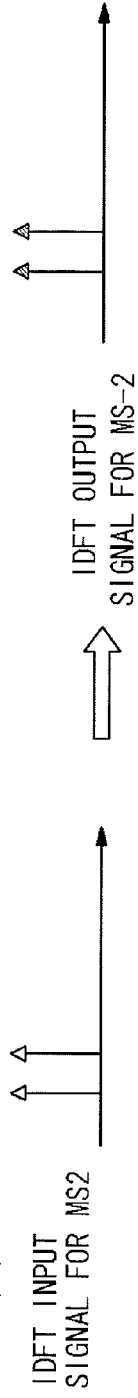

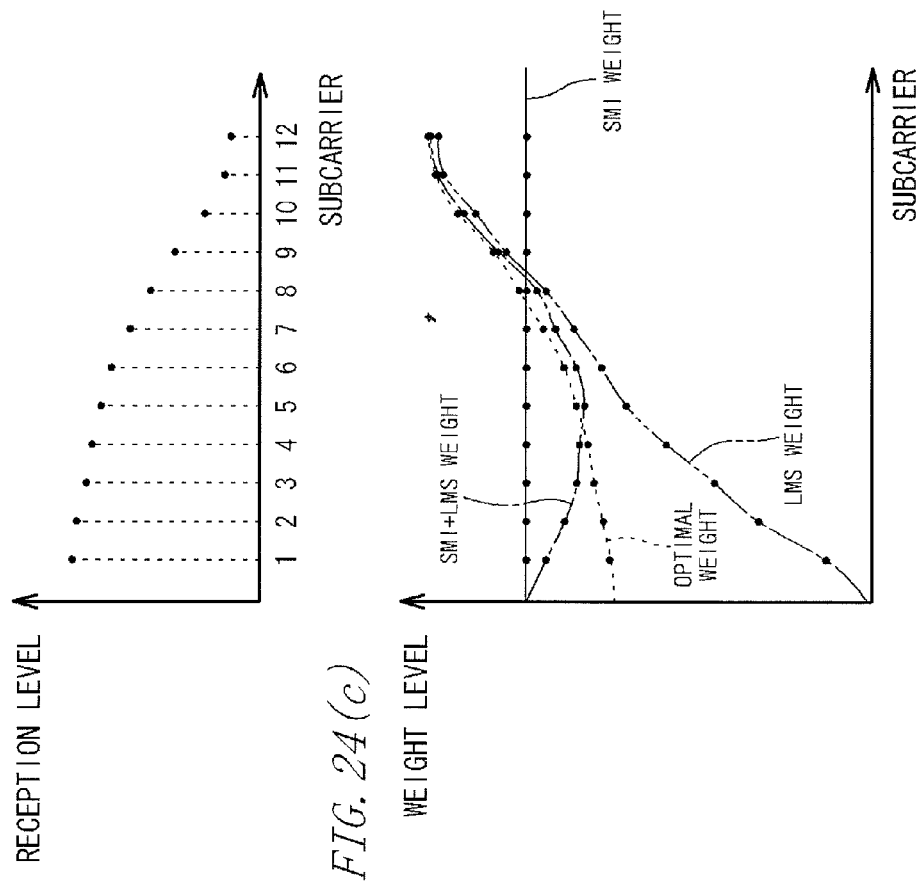
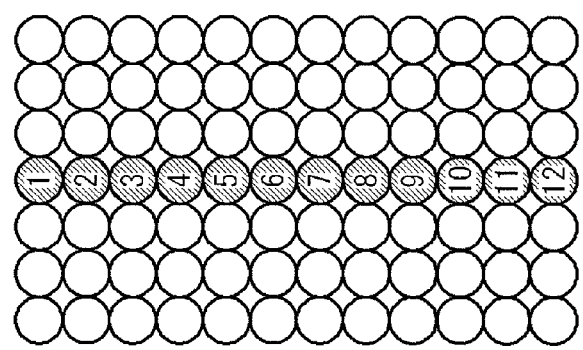
FIG. 24(a)
FIG. 24(b)
FIG. 24(c)

WIRELESS COMMUNICATION APPARATUS USING AN ESTIMATE OF THE AMOUNT-OF-PHASE ROTATION USING PILOT SIGNALS

TECHNICAL FIELD

The present invention relates to a wireless communication apparatus.

BACKGROUND ART

As an algorithm for adaptive array, a Minimum Square Error (MMSE) is known. The MMSE algorithm is a system for determining an optimal weight (MMSE weight) by minimizing the difference between a reference signal which is a desired array response and an actual array output signal (see Non Patent Literature 1).

Here, in communication standards such as WiMAX (Worldwide Interoperability for Microwave Access) and LTE (Long-Term Evolution), a plurality of users (terminals) can perform multiple access to a base station by a frequency division multiple access scheme.

A signal in the frequency division multiple access scheme (hereinafter, referred to as an "FDMA signal") is composed of a plurality of subcarriers arranged side by side in a frequency direction. Therefore, to compute MMSE weights, signals (time domain received signals) received by a plurality of antennas, respectively, need to be subjected to a discrete Fourier transform (FFT; Fast Fourier Transform) to transform the signals into frequency domain received signals. The frequency domain received signals are used for computation of MMSE weights.

In addition, in the frequency division multiple access scheme, a minimum unit of resource allocation composed of a predetermined number of subcarriers and a predetermined number of symbols is set. For example, in LTE, the minimum unit of resource allocation to users is called a resource block. A resource block in LTE is formed as an area of 12 subcarriers×7 or 6 symbols and a communication frame is formed of a set of multiple resource blocks.

A base station performs resource allocation such that one or a plurality of resource blocks (minimum units of resource allocation to users) are allocated to each user terminal, and the base station and the user terminals perform communication using resource blocks according to the resource allocation.

CITATION LIST

Non Patent Literature

Non Patent Literature 1: Nobuyoshi Kikuma, "Signal Processing with Array Antenna", 1st edition, Kagaku Gijutsu Shuppan, Inc., 1998, p. 35

SUMMARY OF INVENTION

Technical Problem

An object of the present invention is to obtain a better weight, more specifically as follows.

Ideal transmission timing changes momentarily by a clock mismatch between a base station and a terminal, movement of the terminal, and a change in communication environment. To deal with such a change, the terminal obtains timing shift information from the base station to adjust a shift in signal timing.

However, with only a timing adjustment such as that described above, there is a problem of causing degradation in the performance of MMSE combining.

For example, the resolution (granularity) of a timing adjustment using random access in LTE is about 1 [μs] and this is converted to 30 samples (about 1 [μs]=30 [samples]) in the number of FFT samples. The resolution of a timing adjustment by a closed loop after communication connection establishment is 16 [samples].

As such, in LTE, only a resolution of 16 samples can be obtained at the maximum. As a result, on the receiver side, a timing offset which is an FFT timing shift of a received signal occurs.

In the MMSE combining scheme, when such a timing shift occurs, correct weight computation cannot be performed, decreasing weight calculation accuracy.

One object of the present invention from the above-described viewpoint is to prevent a decrease in weight calculation accuracy in MMSE combining caused by the occurrence of a timing shift such as that described above.

Meanwhile, in wireless communication, to securely receive desired radio waves, adaptive array using multi-antenna is utilized. The adaptive array requires to optimize a weight for adjusting the amplitude and phase of a received signal.

In Non Patent Literature 1, as weight optimization algorithms for MMSE (Minimum Mean Square Error) adaptive array, an LMS (Least Mean Square) algorithm, RLS (Recursive Least-Squares), an SMI (Sample matrix inversion) algorithm, etc., are described.

When, as in LTE, a plurality of minimum units of resource allocation to users (hereinafter, also simply referred to as "minimum units") are set in a single communication frame, each minimum unit may be used by different user terminals. That is, one communication frame may be used by a plurality of user terminals.

Since the locations of respective user terminals differ from each other, the transmission line characteristics and radio wave conditions between a base station and a user terminal vary from user terminal to user terminal. Therefore, an optimal weight varies from user terminal to user terminal. Hence, in terms of a single communication frame, an optimal weight greatly fluctuates in the frame. Moreover, even in a minimum unit, due to, for example, the difference between transmission line characteristics for different frequencies (subcarriers), an optimal weight may fluctuate.

As such, in a scheme in which resource allocation is performed on each user on a minimum-unit-by-minimum-unit-basis, there are problems that an optimal weight greatly fluctuates in a communication frame and an optimal weight also fluctuates in a minimum unit.

However, conventional, general LMS, RLS, SMI algorithms, etc., cannot sufficiently deal with problems such as those described above.

Another object of the present invention from the above-described viewpoint is therefore to determine a more appropriate weight in a communication scheme in which resource allocation to users is performed.

As described above, the object of the present invention is to obtain a better weight. One more specific object is to prevent a decrease in weight calculation accuracy in MMSE combining, and another more specific object is to determine a more appropriate weight in a communication scheme in which resource allocation to users is performed.

Solution to Problem (1) The present invention in terms of preventing a decrease in weight calculation accuracy in MMSE combining is directed to a wireless communication apparatus including an MMSE combining processing unit that performs MMSE combining based on frequency domain received signals obtained by performing a discrete Fourier transform on received signals, the apparatus including: an amount-of-phase-rotation estimating unit that estimates an amount of phase rotation occurring in the frequency domain received signals due to a shift in discrete Fourier transform timing of the received signals; and a reverse rotation unit that applies a reverse rotation of an amount of rotation corresponding to the amount of phase rotation estimated by the amount-of-phase-rotation estimating unit, to the frequency domain received signals, wherein the MMSE combining processing unit computes an MMSE weight based on the frequency domain received signals to which the reverse rotation has been applied by the reverse rotation unit, and performs MMSE combining.

According to the above-described present invention, even if a shift occurs in the discrete Fourier transform timing of received signals, a reverse rotation of an amount of rotation corresponding to the phase rotation of frequency domain received signals caused by the timing shift is applied to the frequency domain received signals and then an MMSE weight is computed. Thus, a decrease in weight calculation accuracy can be prevented.

(2) The amount-of-phase-rotation estimating unit is configured to estimate an amount of phase rotation based on a frequency domain received signal obtained after MMSE combining performed once, the reverse rotation unit is configured to apply a reverse rotation of an amount of rotation corresponding to the amount of phase rotation estimated based on the frequency domain received signal obtained after the MMSE combining performed once, to frequency domain received signals obtained before the MMSE combining, and the MMSE combining processing unit can compute an MMSE weight based on the frequency domain received signals to which is applied the reverse rotation of the amount of rotation corresponding to the amount of phase rotation estimated based on the frequency domain received signal obtained after the MMSE combining performed once, and perform MMSE combining.

Since a frequency domain received signal obtained after MMSE combining is expected to have higher reliability than frequency domain signals obtained before the combining, by estimating an amount of phase rotation using the frequency domain received signal obtained after the MMSE combining, an amount of phase rotation can be estimated with a higher degree of accuracy.

(3) It is preferred that a series of processes by the amount-of-phase-rotation estimating unit, the reverse rotation unit, and the MMSE combining processing unit be repeatedly performed. By repeating such a series of processes, an error in the estimation of an amount of phase rotation can be reduced.

(4) The wireless communication apparatus further includes: a replica generating unit that generates, based on a demodulated signal obtained by demodulating a data signal included in a frequency domain received signal obtained after MMSE combining performed once, a transmitted signal replica for the data signal, the amount-of-phase-rotation estimating unit is configured to estimate an amount of phase rotation based on a pilot signal and a frequency domain received signal for the pilot signal, the amount-of-phase-rotation estimating unit is configured to further consider the transmitted signal replica as a pilot signal and thereby estimate an amount of phase rotation also using a frequency domain received signal for the data signal, the reverse rotation unit is configured to apply a reverse rotation of an amount of rotation corresponding to the amount of phase rotation estimated also using the frequency domain received signal for the data signal, to frequency domain received signals obtained before the MMSE combining, and the MMSE combining processing unit can compute an MMSE weight based on the frequency domain received signals to which is applied the reverse rotation of the amount of rotation corresponding to the amount of phase rotation estimated also using the frequency domain received signal for the data signal, and perform MMSE combining.

By using a transmitted signal replica generated by demodulating a received signal, the same effect as that obtained when the number of pilot signals increases can be obtained, and thus, the estimation accuracy of the amount of phase rotation can be improved.

(5) It is preferred that the replica generating unit be configured to generate the transmitted signal replica for the data signal based on a signal obtained after performing error correction on the demodulated signal. By performing error correction, the estimation accuracy of a transmitted signal replica improves.

(6) It is preferred that the amount-of-phase-rotation estimating unit perform estimation of an amount of phase rotation, excluding a transmitted signal replica for a data signal whose error has not been able to be corrected or whose error has been detected, from transmitted signal replicas to be used for the estimation of an amount of phase rotation. In this case, the reliability of a replica improves.

(7) It is preferred that a series of processes by the replica generating unit, the phase rotation estimating unit, the reverse rotation unit, and the MMSE combining processing unit be repeatedly performed. By repeating these processes, an error in the estimation of an amount of phase rotation can be reduced.

(8) The present invention in terms of determining a more appropriate weight in a communication scheme in which resource allocation to users is performed is directed to a wireless communication apparatus that is based on a communication scheme in which resource allocation to users is performed and that includes an array antenna system performing array combining using array combining weights, the apparatus including: a first weight computing unit that computes, using, as sample values, only a plurality of received signals included in an area allocated to a same user, an initial weight for the area allocated to the user; and a second weight computing unit that performs computation by a sequential update type algorithm that sequentially updates, using, as sample values, only the plurality of received signals included in the area allocated to the user, a weight for each of the sample values, wherein the second weight computing unit is configured to: use the initial weight computed for the area allocated to the user, as an initial value of a weight for the sequential update type algorithm; and perform computation to update the weight by the sequential update type algorithm for each of the sample values in the area allocated to the user, and thereby determine an array combining weight for each of the sample values in the area allocated to the user.

According to the above-described present invention, the first weight computing unit computes, using, as sample values, only a plurality of received signals included in an area allocated to the same user, an initial weight for the area allocated to the same user.

Therefore, since received signals in an area allocated to another user are not used as sample values, even when resource allocation to users is performed, a relatively appropriate weight (initial weight) can be obtained for each of the areas, each allocated to the same user.

Furthermore, the second weight computing unit of the present invention uses the initial weight computed by the first weight computing unit for the area allocated to the same user, as an initial value for a sequential update type algorithm such as an LMS algorithm or an RLS algorithm. The initial value is, as described above, already a relatively appropriate weight from the viewpoint of the entire area allocated to the same user.

In general, in a sequential update type algorithm such as an LMS algorithm or an RLS algorithm, since a weight update is performed on a sample-value-by-sample-value basis, a weight for each sample value is obtained and thus the algorithm is advantageous for a communication environment where a weight varies from sample value to sample value.

However, in such a sequential update type algorithm, an initial value of a weight to be updated is required. Here, assuming that a weight for an area allocated to another user is used as an initial value, in an initial weight update for the area allocated to the same user, an appropriate weight cannot be obtained due to being affected by a weight value computed for another user.

On the other hand, the second weight computing unit of the present invention uses, as an initial value, a weight (initial weight) which is appropriate to some extent for the area allocated to the same user. Then, computation to update a weight is performed on a sample-value-by-sample-value basis, the sample values being in the area allocated to the same user, and an array combining weight for each of the sample values in the area allocated to the same user is determined.

As a result, in a communication scheme in which resource allocation to users is performed, an appropriate array combining weight for each sample value in the area allocated to the same user can be determined.

(9) It is preferred that the area allocated to the user be a minimum unit of resource allocation to users (e.g., a resource block in LTE).

Determination of an area allocated to a user can also be performed based on, for example, information on resource allocation to users. However, as described above, by the area allocated to the user being a minimum unit of resource allocation to users, an area guaranteed to be allocated to the same user can be identified even without allocation information. That is, since each of the minimum units of resource allocation to users is guaranteed to be allocated to the same user under the communication standard, by computing a weight on a per minimum unit of resource allocation to users basis, only received signals included in an area allocated to the same user can be used as sample values.

(10) It is preferred that an algorithm used by the first weight computing unit to compute the initial weight differ from an algorithm used by the second weight computing unit for array combining weight computation.

In this case, for an algorithm used by the first weight computing unit, an algorithm suitable for computing the initial weight which is an appropriate weight value from the viewpoint of the entire area allocated to the same user can be employed without concern for an algorithm used by the second weight computing unit.

(11) It is preferred that the algorithm used by the first weight computing unit to compute the initial weight be an SMI algorithm using, as sample values, only the plurality of received signals included in the area allocated to the user.

Unlike sequential update type algorithms, the SMI algorithm is an algorithm that determines an optimal weight directly from sample values, and even with a relatively small number of sample values, a relatively appropriate weight can be computed. Therefore, even when only a plurality of received signals included in an area allocated to the same user are used as sample values, a relatively excellent initial weight can be computed.

(12) It is preferred that the sequential update type algorithm be an LMS algorithm or an RLS algorithm using the initial weight computed for the area allocated to the user, as an initial value of a weight.

BRIEF DESCRIPTION OF DRAWINGS

FIG. 8 is an illustrative diagram of a timing offset.

FIG. 19(a) shows a frequency domain signal (before user separation) after equalization, FIG. 19(b) shows a signal for user 1 (MS1), FIG. 19(c) shows a signal for user 2 (MS2), and FIG. 19(d) shows a signal for user 3 (MS3).

FIG. 24(a) is a diagram showing a resource block, FIG. 24(b) is a graph showing a reception level for each subcarrier (reference signal), and FIG. 24(c) is a graph showing an optimal weight and a single SMI weight for each subcarrier (reference signal).

DESCRIPTION OF EMBODIMENTS

Preferred embodiments of the present invention will be described below with reference to the accompanying drawings. Note that although in the embodiments description is made using LTE as an example of a communication scheme, the communication scheme is not limited thereto.

1. First Embodiment

Figure 1:
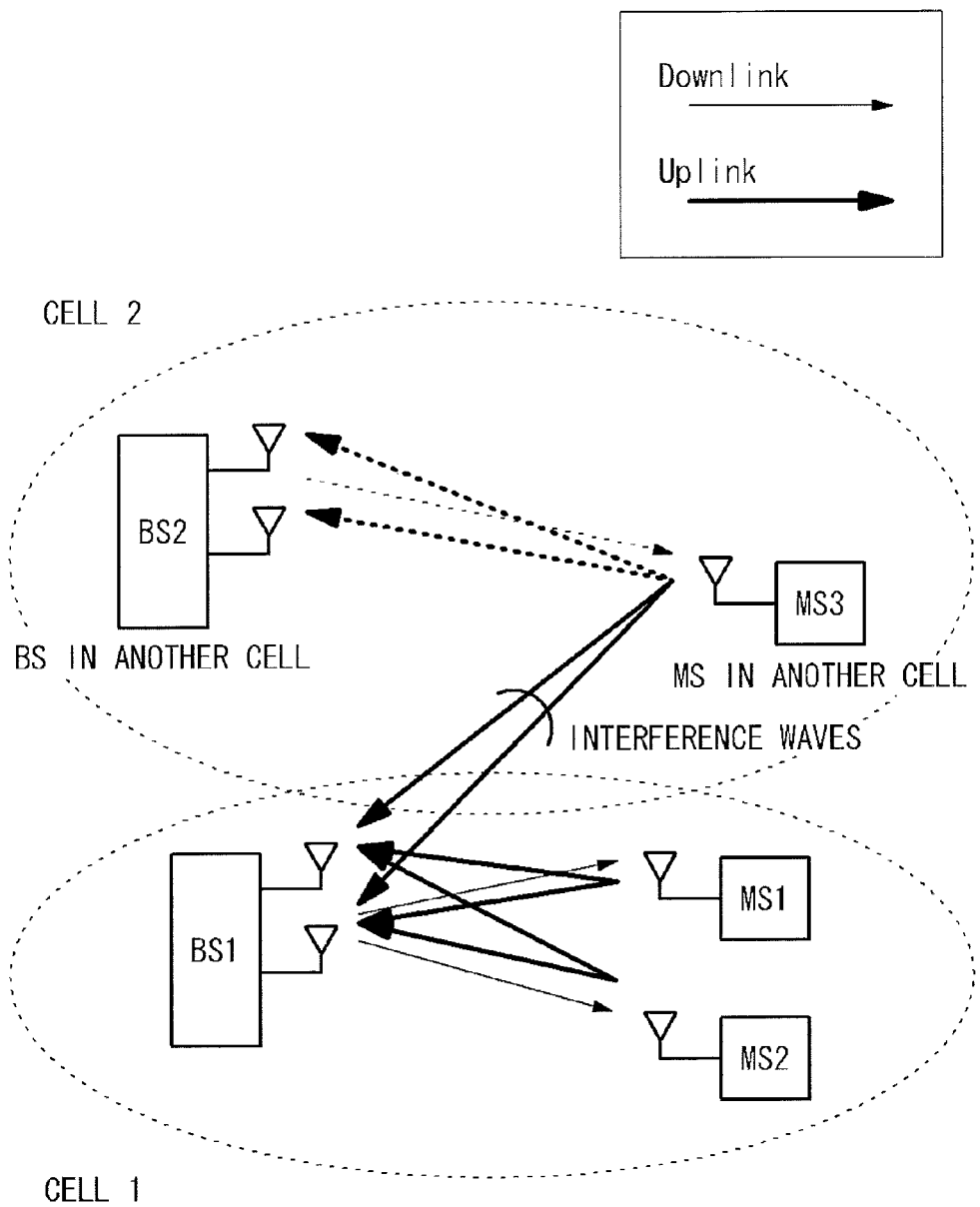
FIG. 1 is an overall view of a wireless communication system.

FIG. 1 shows a wireless communication system of an LTE scheme (e.g., a communication system for mobile phones). As shown in FIG. 1, the communication system adopts a cell configuration and thus base station apparatuses BS1 and BS2 are installed in respective cells.

The base station apparatuses BS1 and BS2 perform communication with mobile stations (user terminals) MS1, MS2, and MS3 in their cells. In addition, each base station apparatus BS1 can perform simultaneous communications with the plurality of mobile stations MS1 and MS2 in its cell.

In this communication system, the downlink employs Orthogonal Frequency Division Multiple Access (OFDMA) and the uplink employs Single Carrier Frequency Division Multiple Access (SC-FDMA). Hence, the base station apparatuses BS1 and BS2 each have a transmitter circuit that supports the OFDMA scheme; and a receiver circuit that supports the SC-FDMA scheme. The mobile stations MS1, MS2, and MS3 each have a transmitter circuit that supports the SC-FDMA scheme; and a receiver circuit that supports the OFDMA scheme.

Figure 2:
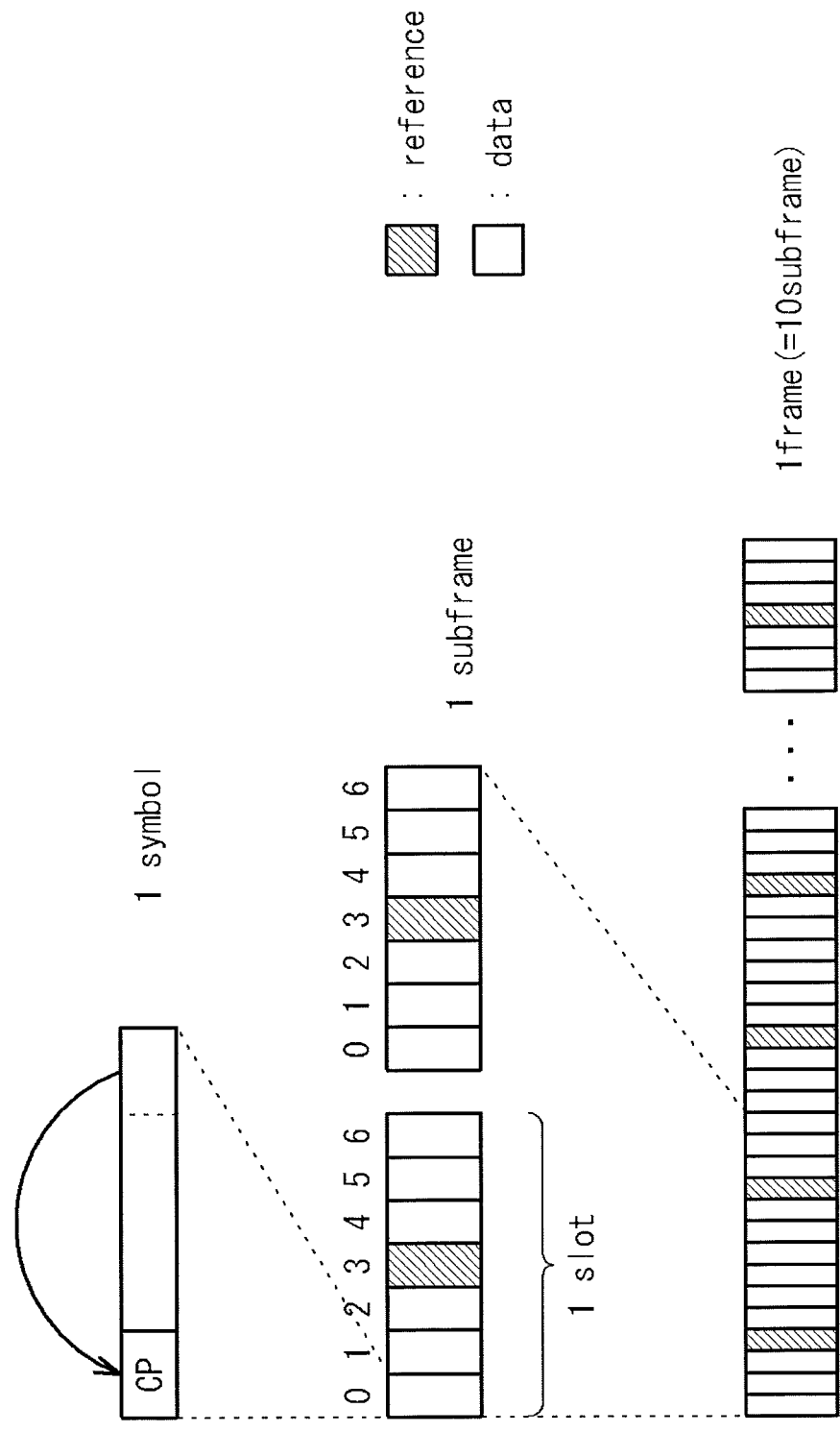
FIG. 2 is a diagram of an LTE uplink frame structure.

FIG. 2 shows an LTE uplink frame structure. This frame is shared by a plurality of mobile stations by frequency division multiplexing, enabling multiple access to a base station apparatus. In addition to frequency multiplexing, spatial multiplexing may be performed. Note that each mobile station achieves frame synchronization by random access by a base station apparatus.

As shown in FIG. 2, one LTE uplink frame is configured of 10 subframes arranged side by side in a time-axis direction, and has a time length of 10 [ms].

One subframe is configured of two slots arranged side by side in the time-axis direction, and has a time length of 1 [ms]. One slot is configured of seven (or six) symbols (SC-FDMA symbols) arranged side by side in the time-axis direction, and has a time length of 0.5 [ms].

To the front of each SC-FDMA symbol is added a copy of the last portion of the symbol, as a CP (Cyclic Prefix). Note that each SC-FDMA symbol is configured of N subsymbols (N is an integer greater than or equal to 2) which are modulated data symbols (QPSK modulated data symbols, QAM modulated data symbols, etc.).

In an LTE uplink data channel, the fourth symbol (symbol number 3) in a slot is a reference signal which is a known signal. In the following, the reference signal is also referred to as a "pilot signal".

Figure 3:
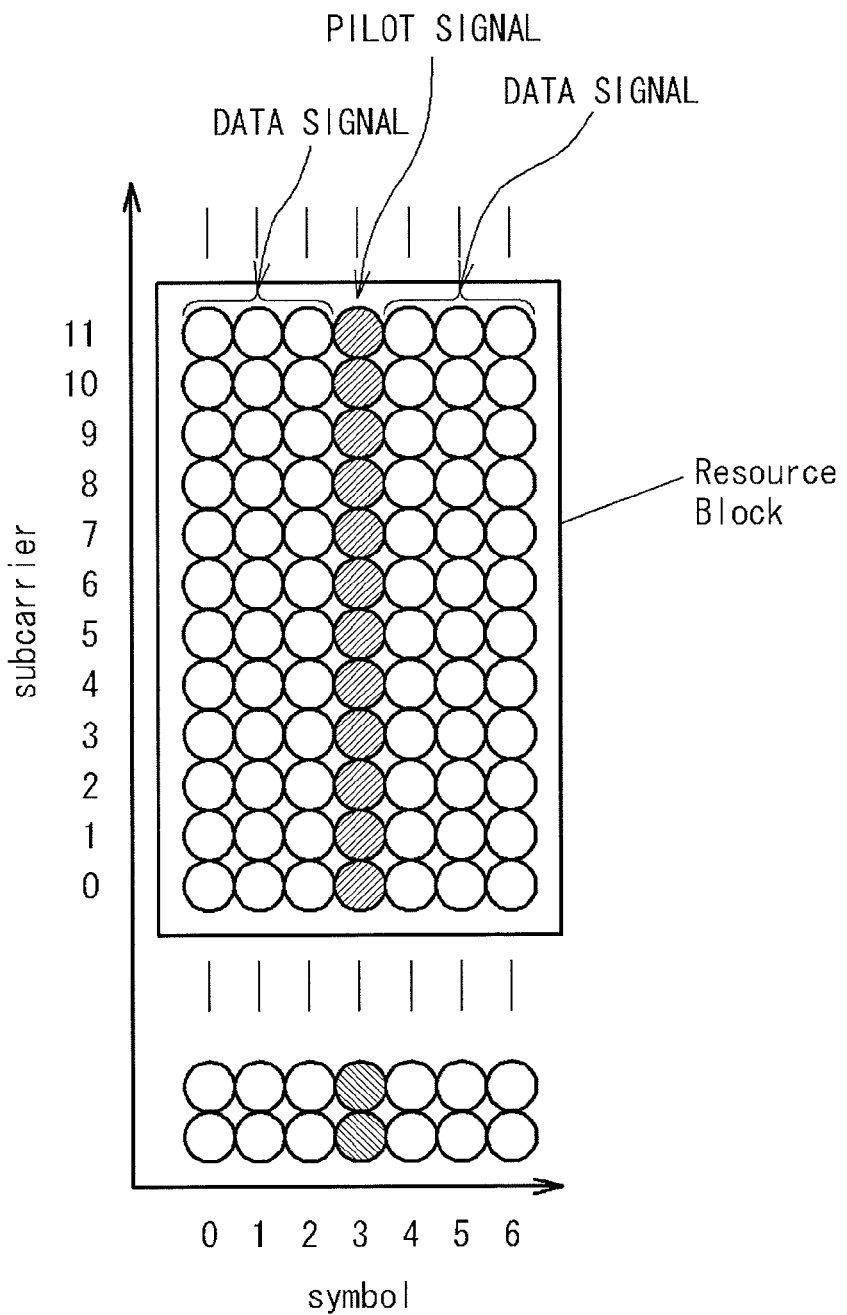
FIG. 3 is a diagram showing a resource block in a two-dimensional arrangement with a time (symbol) axis and a frequency (subcarrier) axis.

Other symbols in the slot are data signals. As also shown in FIG. 3, in the fourth symbol (symbol number 3) in a slot, all subcarriers (subcarrier numbers 1 to 12) are reference signals.

In LTE, a minimum unit of resource allocation, called a resource block, is set and one resource block includes 7 or 6 symbols×12 subcarriers. In LTE, when viewed in the time-axis direction (symbol direction), the same subcarrier (frequency band) is allocated to the same user. That is, a plurality of resource blocks consecutively arranged side by side in the time-axis direction are allocated to the same user.

Note that one resource block corresponds to one slot.

Note that allocation of resource blocks to users is determined by the base station apparatuses BS1 and BS2, and determined user allocation information (user information; MAP information) is notified to each of the mobile stations MS1, MS2, and MS3 using a downlink frame. Each of the mobile stations MS1, MS2, and MS3 performs uplink communication using one or a plurality of resource blocks allocated by the base station apparatuses.

Figure 4:
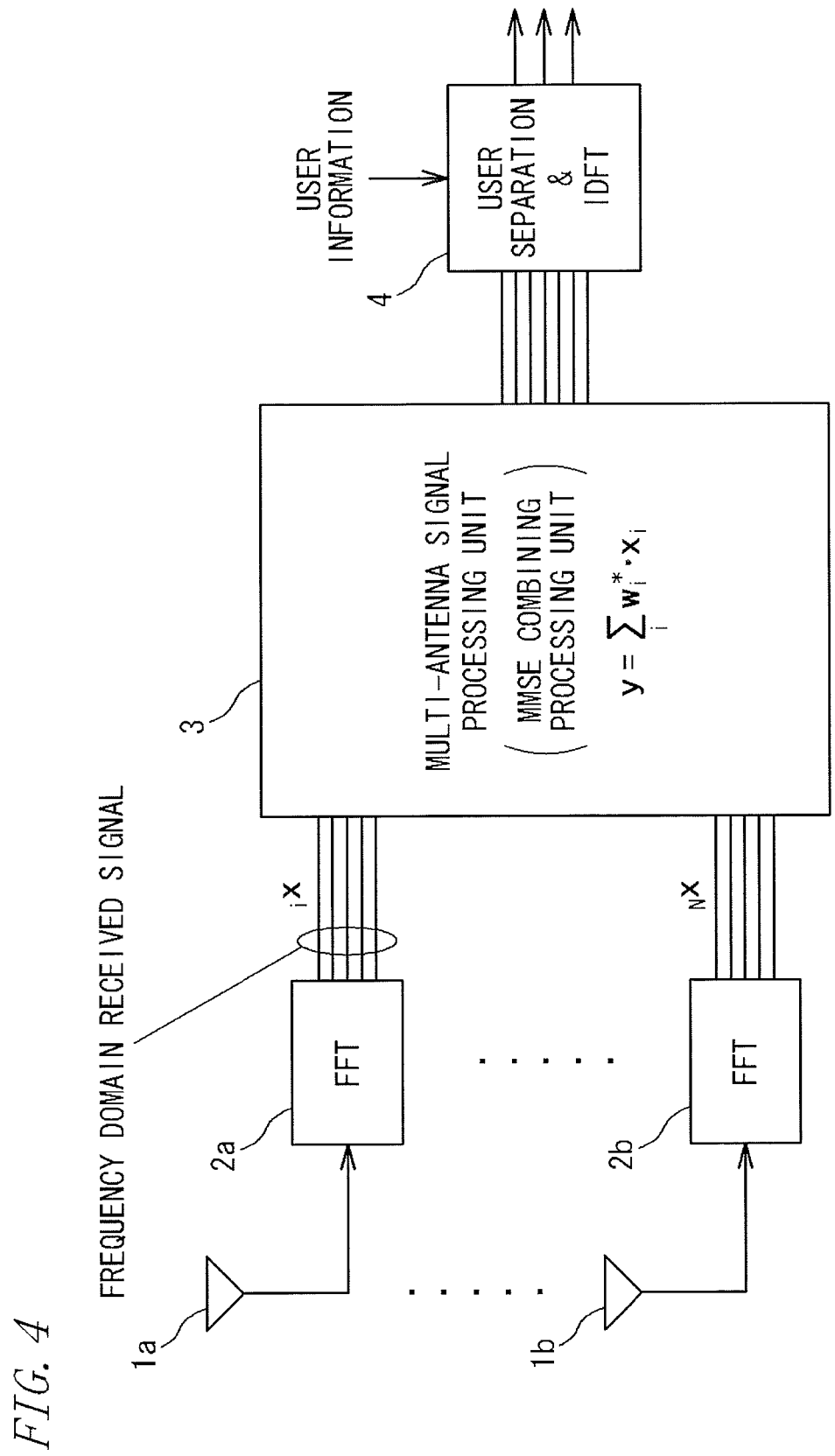
FIG. 4 is a block diagram of a base station apparatus.

FIG. 4 shows the configuration of the base station apparatuses BS1 and BS2 according to the first embodiment. The base station apparatuses BS1 and BS2 each include a plurality of (two in FIG. 4) antennas $1a$ and $1b$ for an adaptive array process (MMSE combining process).

Signals (time domain signals) received by the respective antennas $1a$ and $1b$ are transformed into frequency domain received signals $x_1$ and $x_2$ by FFT units (Fast Fourier Transform units; Discrete Fourier Transform units) $2a$ and $2b$, respectively.

Note that, though not shown, the signals received by the antennas $1a$ and $1b$ are subjected to various processes, such as amplification, frequency conversion, A/D conversion, CP removal, and serial-to-parallel conversion, and are then provided to the FFT units $2a$ and $2b$.

Note that each of the FFT units $2a$ and $2b$ outputs a frequency domain received signal for all communication frequency bands (all frequency bands for uplink communication) of the base station apparatus. That is, in each of the frequency domain signals outputted from the respective FFT units $2a$ and $2b$, SC-FDMA received signals for a plurality of users are not demultiplexed and thus the frequency domain signal still includes signals for the plurality of users.

A plurality of frequency domain SC-FDMA received signals outputted from each of the FFT units $2a$ and $2b$ are provided to a single multi-antenna signal processing unit (MMSE combining processing unit) 3, with the frequency domain SC-FDMA received signals still including signals for the plurality of users.

The multi-antenna signal processing unit 3 performs an MMSE array combining process on a plurality of frequency domain received signals x1, . . . , xN received by the plurality of (N) antennas $1a$ and $1b$, and outputs a single signal y as a processing result.

By the array combining process by the multi-antenna signal processing unit (MMSE combining processing unit) 3, interference waves from the mobile station MS3 in another cell which is an interfering station are removed, enabling to improve reception quality. Note that in an MMSE combining scheme, the receiver side computes MMSE weights using known signals (reference signals).

The output signal y obtained as a result of the MMSE combining is demultiplexed by a user separation & IDFT unit 4 into signals for the respective users, and each of the signals for the respective users is subjected to an Inverse Discrete Fourier Transform (IDFT). Note that signal demultiplexing is performed based on user information indicating frequency allocation (resource block allocation) for each user.

Figure 5:
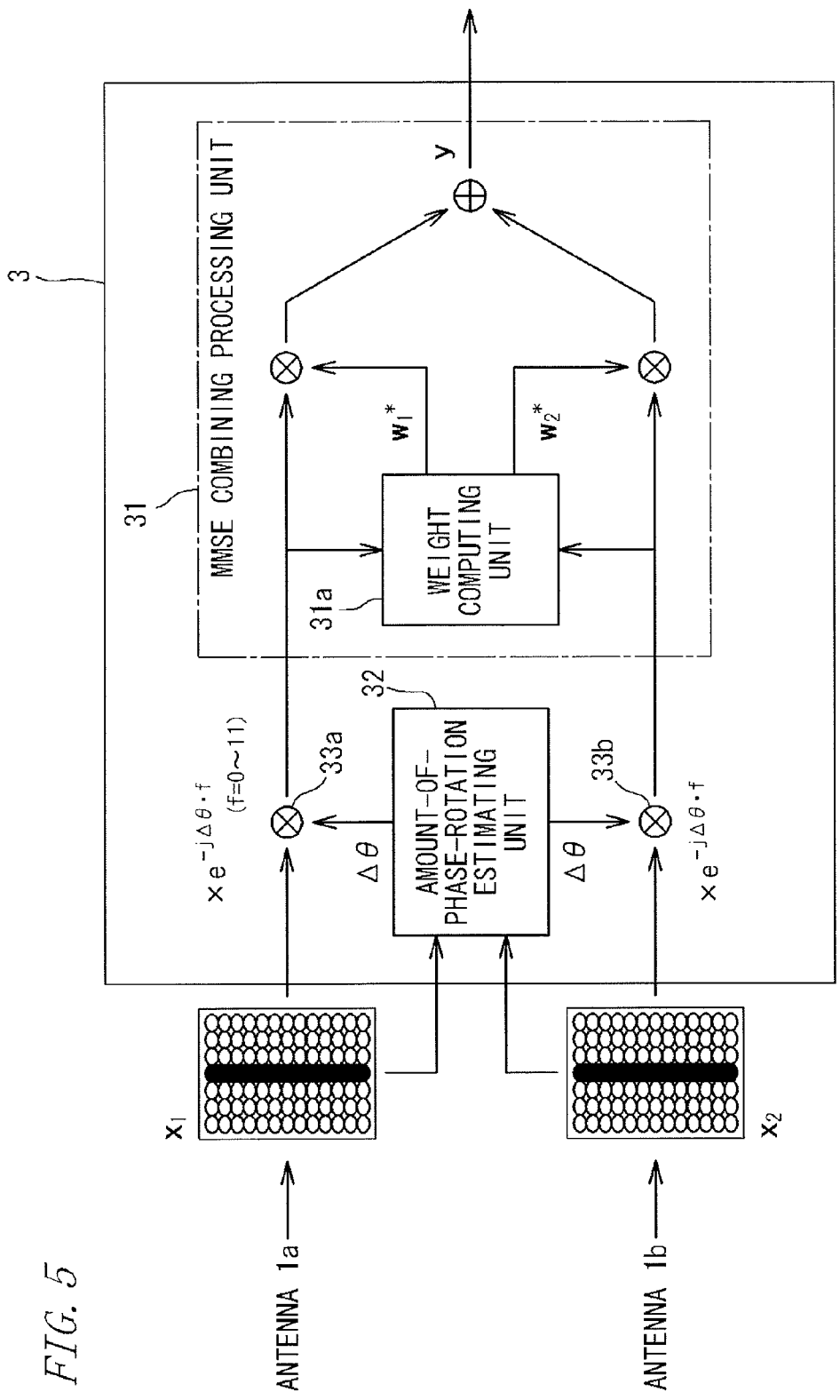
FIG. 5 is a block diagram of a multi-antenna signal processing unit according to a first embodiment.
Figure 6:
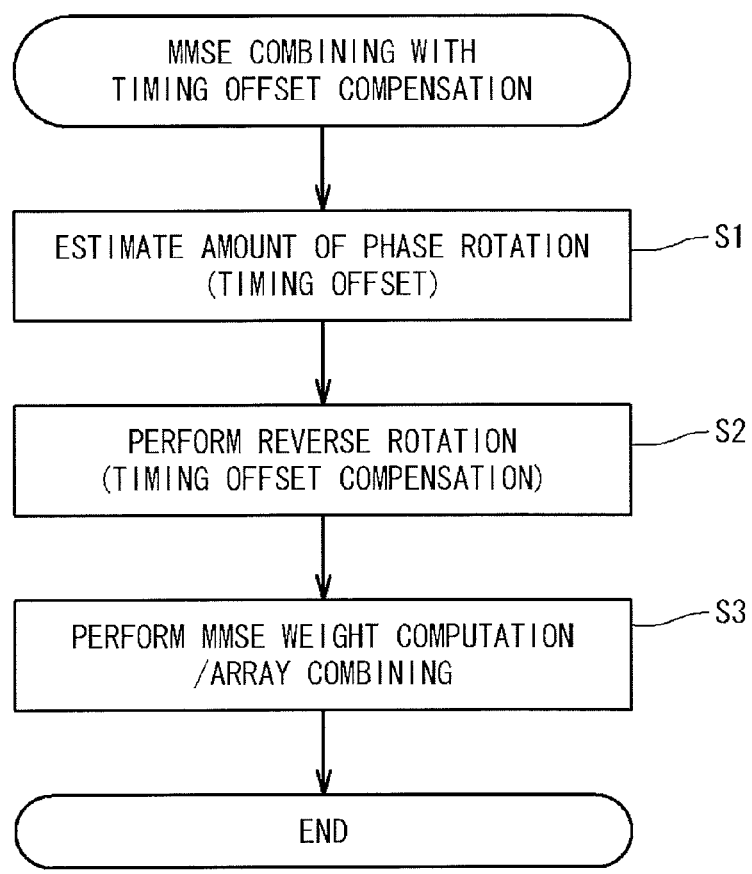
FIG. 6 is a flowchart of an MMSE combining process with timing offset compensation.

FIG. 5 shows the multi-antenna signal processing unit 3 according to the present embodiment, and FIG. 6 shows a processing procedure of an MMSE combining process (an MMSE combining process with timing-offset compensation) performed by the multi-antenna signal processing unit 3.

The multi-antenna signal processing unit 3 includes an amount-of-phase-rotation estimating unit 32 and reverse rotation units $33a$ and $33b$ in addition to an MMSE combining processing unit 31 that performs MMSE weight computation and MMSE combining.

The MMSE combining processing unit 31 has a weight computing unit $31a$ that computes weights based on an MMSE scheme. The MMSE scheme computes a weight based on a pilot signal which is a known signal and a received signal for the pilot signal. That is, in the MMSE scheme, upon weight computation, a received signal for a pilot signal is required.

An MMSE scheme used for weight computation is not particularly limited and, for example, LMS, RLS, SMI, NLMS, the Kalman filter, an affine projection method, etc., can be employed but it is preferred to use SMI which is a direct method.

In addition, the MMSE combining processing unit 31 computes a weight on a resource-block-by-resource-block basis, the resource block being a minimum unit of resource allocation to users, and performs array combining. Specifically, by using only pilot signals in a resource block which is a weight computation target, a weight is computed by an SMI algorithm, etc., and the weight is used to combine signals (data signals) in the resource block which is the weight computation target.

By determining a weight on a resource-block-by-resource-block basis, the resource block being a minimum unit of resource allocation to users, and performing array combining, a weight can be computed using only reference signals transmitted from the same user, and thus, a weight can be prevented from being inappropriately computed using reference signals transmitted from a different user. In addition, even if interference waves are received from a plurality of interfering terminals, interference removal can be performed.

The amount-of-phase-rotation estimating unit 32 estimates an amount of phase rotation $\Delta\theta$ occurring in each of frequency domain received signals $x_1$ and $x_2$ upon an FFT (Discrete Fourier Transform) due to a shift in the FFT timing (Discrete Fourier Transform timing) of received signals received by the respective antennas 1a and 1b, in the FFT units 2a and 2b (hereinafter, referred to as a "timing offset") (step S1 in FIG. 6).

The reverse rotation units 33a and 33b apply a reverse rotation of an amount of rotation corresponding to the amount of phase rotation $\Delta\theta \cdot f$ (f=0 to 11) estimated by the amount-of-phase-rotation estimating unit 32, to each of the frequency domain received signals $x_1$ and $x_2$, and thereby cancel out the phase rotation occurring due to the timing offset (step S2 in FIG. 6). By applying such a reverse rotation, timing offset compensation can be performed.

To the inputs of the MMSE combining processing unit 31 are provided the frequency domain received signals $x_1$ and $x_2$ to which the reverse rotation has been applied. Therefore, the MMSE combining processing unit 31 performs weight calculation based on the frequency domain received signals $x_1$ and $x_2$ to which the reverse rotation has been applied, and performs array combining (step S3 in FIG. 6).

The significance of performing an MMSE combining process such as that described above will be described in more detail below based on FIGS. 7 to 9.

Figure 7:
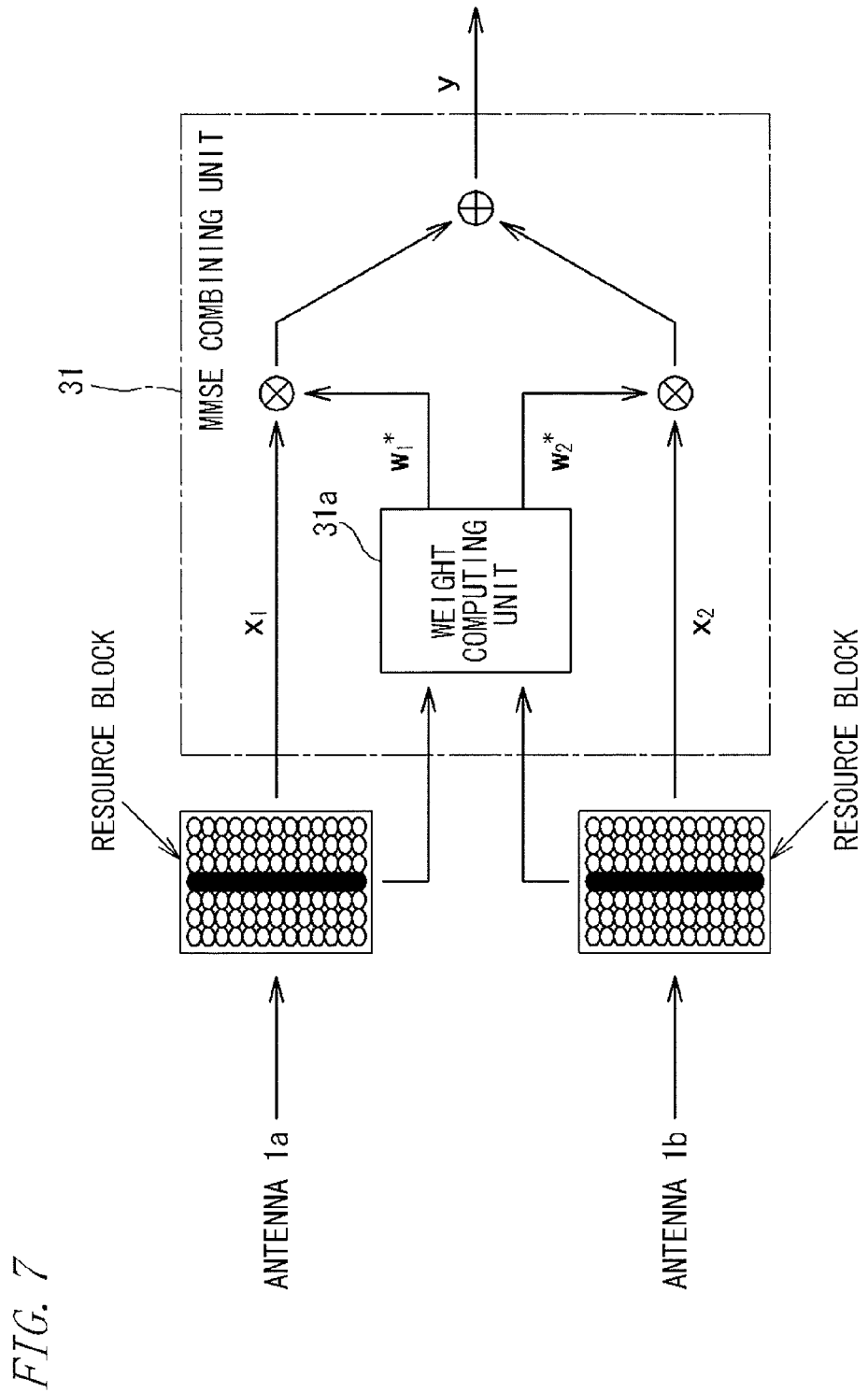
FIG. 7 is a block diagram of a multi-antenna signal processing unit according to a comparative example.

FIG. 7 shows a multi-antenna signal processing unit 3 (comparative example) where the amount-of-phase-rotation estimating unit 32 and the reverse rotation units 33a and 33b in FIG. 5 are omitted. In FIG. 7, received signals which are transformed into frequency domain signals by the FFT units 2a and 2b are directly inputted to an MMSE combining processing unit 31.

Here, when an FFT is performed, FFT timing may shift. As shown in FIG. 8(a), ideally, an FFT window with a predetermined time length should start immediately after a CP. However, the start position of an FFT window is not always immediately after a CP. As shown in FIG. 8(b), when a received signal is delayed by $\Delta\tau$, an FFT timing shift occurs. That is, in FIG. 8(b), a timing offset of $\Delta\tau$ occurs.

Normally, in order that the signal timing matches between the transmitter side and the receiver side, a timing mismatch is detected between the transmitter side and the receiver side and a timing adjustment is made. However, such a timing adjustment is not made for an MMSE combining process and thus does not have such a degree of accuracy that does not cause an FFT timing shift. Hence, a timing offset $\Delta\tau$ such as that described above occurs on the receiver side.

If an FFT is performed with such a timing offset $\Delta\tau$ occurring, then phase rotation occurs in a frequency domain signal obtained as a result of the FFT.

Figure 9A:
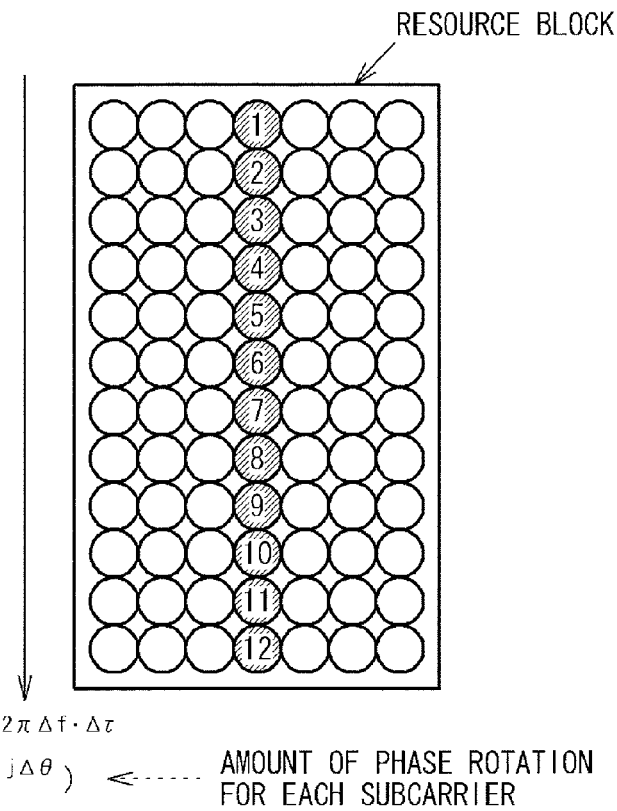
FIG. 9 is a diagram showing phase rotation caused by a timing offset and reverse rotation thereof.
Figures 9B, 9C:
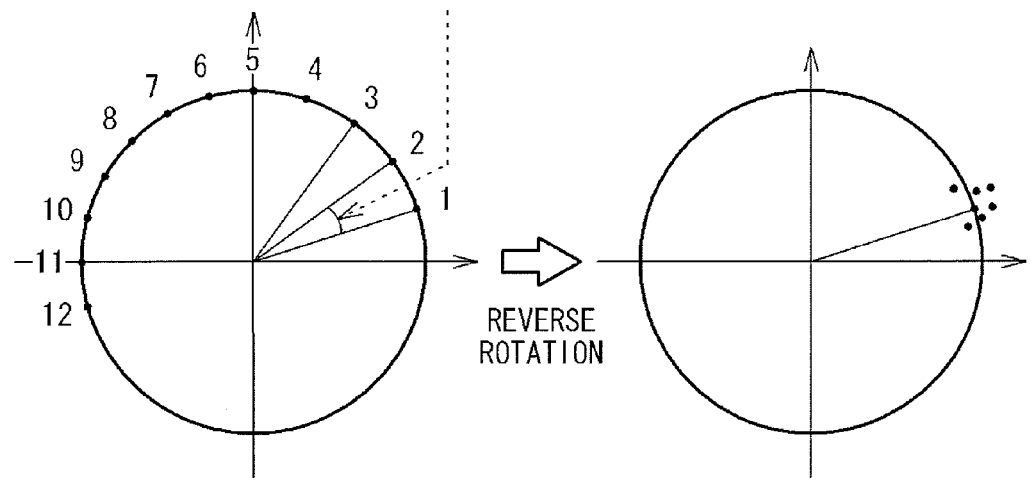

For example, in the case in which, as in LTE, 12 pilot signals (reference signals) are arranged side by side in a subcarrier (frequency) direction, when the interval between adjacent subcarriers is $\Delta f$ [Hz], the amount of phase rotation for each subcarrier is $e^{j2\pi\Delta f \Delta\tau}$, and the amount of phase rotation $\Delta\theta$ of each of the 12 pilot signals (subcarriers) is represented as shown in FIG. 9(b). Note that the numbers 1 to 12 shown in FIG. 9(b) correspond to the numbers 1 to 12 attached to the 12 pilot signals in FIG. 9(a).

When, as in FIG. 9(b), a received signal for a pilot signal is subjected to phase rotation, the weight computing unit 31a to which the phase-rotated received signal is inputted performs MMSE weight computation using the phase-rotated received signal. In this case, since a phase difference between a pilot signal whose value is known and a received signal for the pilot signal cannot be properly detected, correct weight computation cannot be performed.

Hence, in the present embodiment, to perform correct weight computation, an amount of phase rotation AO caused by a timing offset is estimated by the amount-of-phase-rotation estimating unit 32 and a reverse rotation is applied by the reverse rotation units 33a and 33b, whereby the phase rotation is reset to the original, as shown in FIG. 9(c). If the phase rotation is reset to the original as shown in FIG. 9(c), then weight computation is properly performed based on a phase difference between a pilot signal whose value is known and a received signal for the pilot signal.

Methods of estimating an amount of phase rotation (an amount of timing offset) adoptable by the amount-of-phase-rotation estimating unit 32 include a mutual correlation method, an ESPRIT method, an AR spectrum method, a Fourier method, a MUSIC method, a method of detecting in the time domain by performing an IFFT, etc.

The amount-of-phase-rotation estimating unit 32 of the present embodiment uses a multiple mutual correlation method which is an improved version of the mutual correlation method. A detail of the multiple mutual correlation method will be described below.

First, each of the phase differences between numbers 1 and 2, numbers 2 and 3, numbers 3 and 4, . . . , numbers 11 and 12 in FIG. 9(a) is an amount of phase rotation $\Delta\theta$ to be determined. Based on the mutual correlation method which serves as a basis for the multiple mutual correlation method, by computing a mutual correlation value (average value) between numbers 1 and 2, numbers 2 and 3, numbers 3 and 4, . . . , numbers 11 and 12 and determining an argument thereof, an amount of phase rotation $\Delta\theta$ to be determined is obtained.

An equation for determining the mutual correlation value by the mutual correlation method is as follows:

$$\text{mutual correlation value } r_1 = \frac{1}{N-1}\sum_{i=1}^{N-1} h_i^* h_{i+1} \quad \text{[Equation 1]}$$

$h_i^*$ represents the complex conjugate of $h_i$.

In the above-described equation, $h_i$ represents the channel estimation value for each subcarrier (pilot signal) and is calculated by the following equation based on a pilot signal $s_i$ whose value is known and a received signal $x_i$ for the pilot signal $s_i$:

channel estimation value $h_i=x_i$(received signal)/$s_i$(pilot signal)$i=1, ***, N$  [Equation 2]

In each of the above-described equations, i corresponds to subcarrier numbers 1 to 12 shown in FIG. 9(a). In addition, N represents the number of pilot signals in a minimum unit of resource allocation to users. In the case of the resource block shown in FIG. 9(a), N=12.

Note that in the present embodiment a weight is calculated on a resource block basis, the resource block being a minimum unit of resource allocation to users, and thus, correspondingly a mutual correlation value is also calculated on a resource block basis, the resource block being a minimum unit of resource allocation to users. That is, upon calculating a mutual correlation value, pilot signals in other resource blocks than a calculation target resource block are not used but only pilot signals in the calculation target resource block are used. By this, upon determining a mutual correlation value, only channel estimation values with the same user are used and thus a mutual correlation value can be appropriately determined.

In the present embodiment, a mutual correlation value is calculated on a resource block basis, the resource block being a minimum unit of resource allocation to users, and thus, the number of pilot signals (12 pilot signals) that can be used to calculate a mutual correlation value is small. Therefore, it is difficult to increase the accuracy of calculation of a mutual correlation value. On the other hand, in the multiple mutual correlation method which is an improved version of the mutual correlation method, the accuracy of calculation can be improved.

In the mutual correlation method, only a phase between adjacent pilot signals is determined from a mutual correlation between numbers 1 and 2, numbers 2 and 3, numbers 3 and 4, ..., numbers 11 and 12 in FIG. 9(a); on the other hand, in the multiple mutual correlation method, mutual correlation values not only for the distance between pilots=1, such as numbers 1 and 2, numbers 2 and 3, numbers 3 and 4, ..., numbers 11 and 12 in FIG. 9(a), but also for the distance between pilots=2, 3, or more, such as numbers 1 and 3, numbers 2 and 4, numbers 3 and 5, ..., numbers 10 and 12, numbers 1 and 4, numbers 2 and 5, numbers 3 and 6, ..., numbers 9 and 12, are determined, and a phase is determined from a plurality of distances between pilots, whereby the accuracy of calculation is improved.

That is, in the multiple mutual correlation method, an equation for determining a mutual correlation value is as follows:

$$r_k = \frac{1}{N-k} \sum_{i=1}^{N-k} h_i^* h_{i+k}$$  [Equation 3]

$$k = 0, 1, \ldots, L-1$$

In the above-described equation, L can take any integer from 2 to N (=12). Increasing L increases the computation load but can improve the accuracy of a mutual correlation value. Therefore, it is preferred that an optimal value of the value of L be determined by performing a simulation.

Based on the above-described equation, L mutual correlation values from $r_0$ to $r_{L-1}$ can be determined.

A more specific description of the above-described equation is as follows.

First, for a channel estimation value $h_i$, a mutual correlation with oneself (for the distance between pilots=0), a mutual correlation for the distance between pilots=1 (for pilot signal numbers 1 and 2, etc.), and a mutual correlation for the distance between pilots=2 (for pilot signal numbers 1 and 3, etc.) are as follows:

mutual correlation with oneself (power) $\quad r_0 = \frac{1}{N} \sum_{i=1}^{N} h_i^* h_i$  [Equation 4]

mutual correlation for the distance between pilots = 1 $\quad r_1 = \frac{1}{N-1} \sum_{i=1}^{N-1} h_i^* h_{i+1}$ mutual correlation for the distance between pilots = 2 $\quad r_2 = \frac{1}{N-2} \sum_{i=1}^{N-2} h_i^* h_{i+2}$ In addition, mutual correlations for the distance between pilots=1 and more can be represented as follows:

$r_1 = e^{j\Delta\theta} * r_0$ $r_2 = e^{j2\Delta\theta} * r_0$ $r_3 = e^{j3\Delta\theta} * r_0$  [Equation 5]

Each of the above-described equations can be rewritten as a single function such as that shown below:

$$\begin{pmatrix} r_1 \\ r_2 \\ r_3 \\ \vdots \end{pmatrix} = e^{j\Delta\theta} \begin{pmatrix} r_0 \\ r_1 \\ r_2 \\ \vdots \end{pmatrix}$$  [Equation 6]

Figure 10:
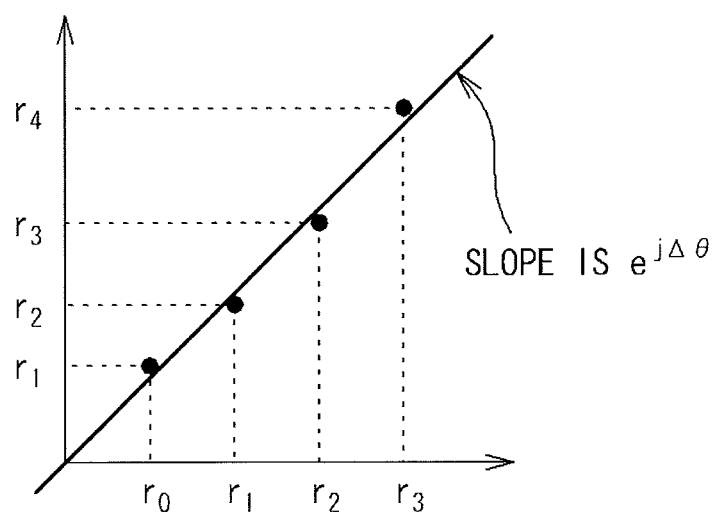
FIG. 10 is a diagram showing the way to determine a phase rotation coefficient.

$e^{j\Delta\theta}$ in the function corresponds to a slope in a function graph in FIG. 10. The slope $e^{j\Delta\theta}$ can be uniquely determined by the method of least squares (linear regression), using the mutual correlations r0, r1, ..., $r_{L-1}$ calculated based on the equation shown in [Equation 3].

Therefore, when $r_x = (r_0, r_1, *, r_{L-1})^T, r_y = (r_1, r_2, *, r_{L-1})^T$  [Equation 7]

a phase rotation coefficient $e^{j\Delta\theta} = \alpha$ is determined as shown in the following equation:

$\alpha = r_x^{+} * r_y$ (method of least squares)  [Equation 8]

Then, from the phase rotation coefficient, an amount of phase rotation $\Delta\theta$ is determined as follows. Note that arg is the arg function for determining an angle.

$\Delta\theta = \arg(\alpha)$  [Equation 9]

As such, in the multiple mutual correlation method, since mutual correlations for a plurality of distances between pilots are determined and a phase rotation angle is calculated, even if the number of pilot signals is small, calculation can be performed with a relatively high degree of accuracy. Therefore, the multiple mutual correlation method is advantageous when using only pilot signals in a minimum unit of resource allocation to users, as in the present embodiment.

2. Second Embodiment/Third Embodiment 2.1 For the Estimation Accuracy of the Amount of Phase Rotation When an amount of phase rotation is estimated on a resource block basis, since the number of pilot signals is only 12 points×the number of antennas, if the signal quality is poor (the CINR is low), then the estimation accuracy of the amount of phase rotation may decrease.

Figure 11A:
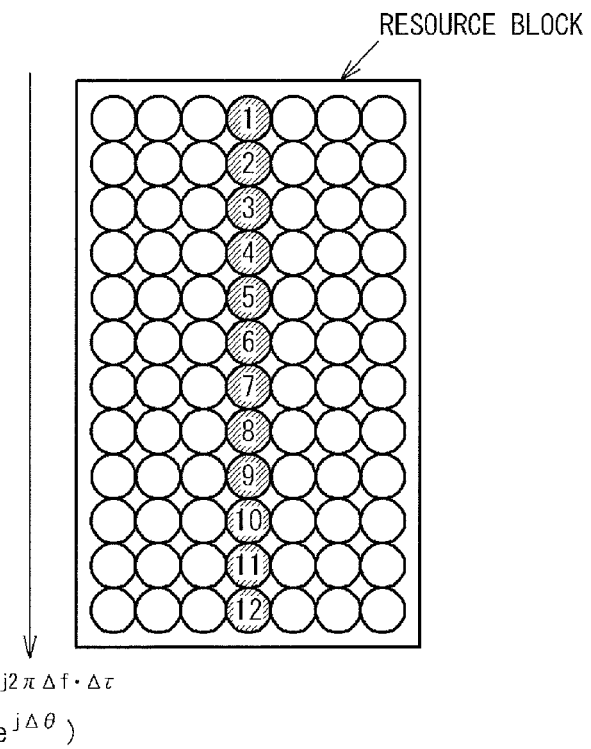
FIG. 11 is a diagram showing phase rotation for when affected by interference waves, and reverse rotation thereof.
Figure 11B:
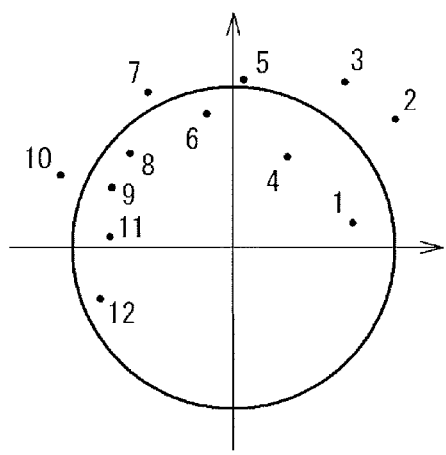
Figure 11C:
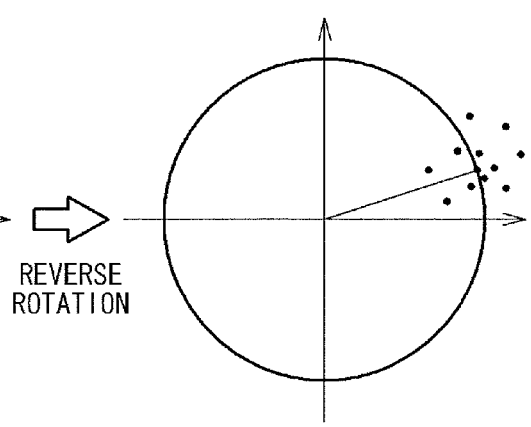

If pilot signals with numbers 1 to 12 in FIG. 11(*a*) are subjected to phase rotation caused by a timing offset $\Delta\tau$ and are greatly affected by interference waves, then as shown in FIG. 11(*b*), variations occur in the phases and magnitudes of the respective pilot signals. Hence, when a state in which a reverse rotation is appropriately applied is one such as that shown in FIG. 11(*c*), it is difficult to estimate a correct amount of phase rotation to apply an appropriate reverse rotation. If the number of pilot signals is very large, then this problem can be reduced, but when the number of pilot signals is small, the problem cannot be overlooked.

Technical means to deal with the above problem will be described below as a second embodiment and a third embodiment.

2.2 Second Embodiment: Repeating Type Offset Estimation

Figure 12:
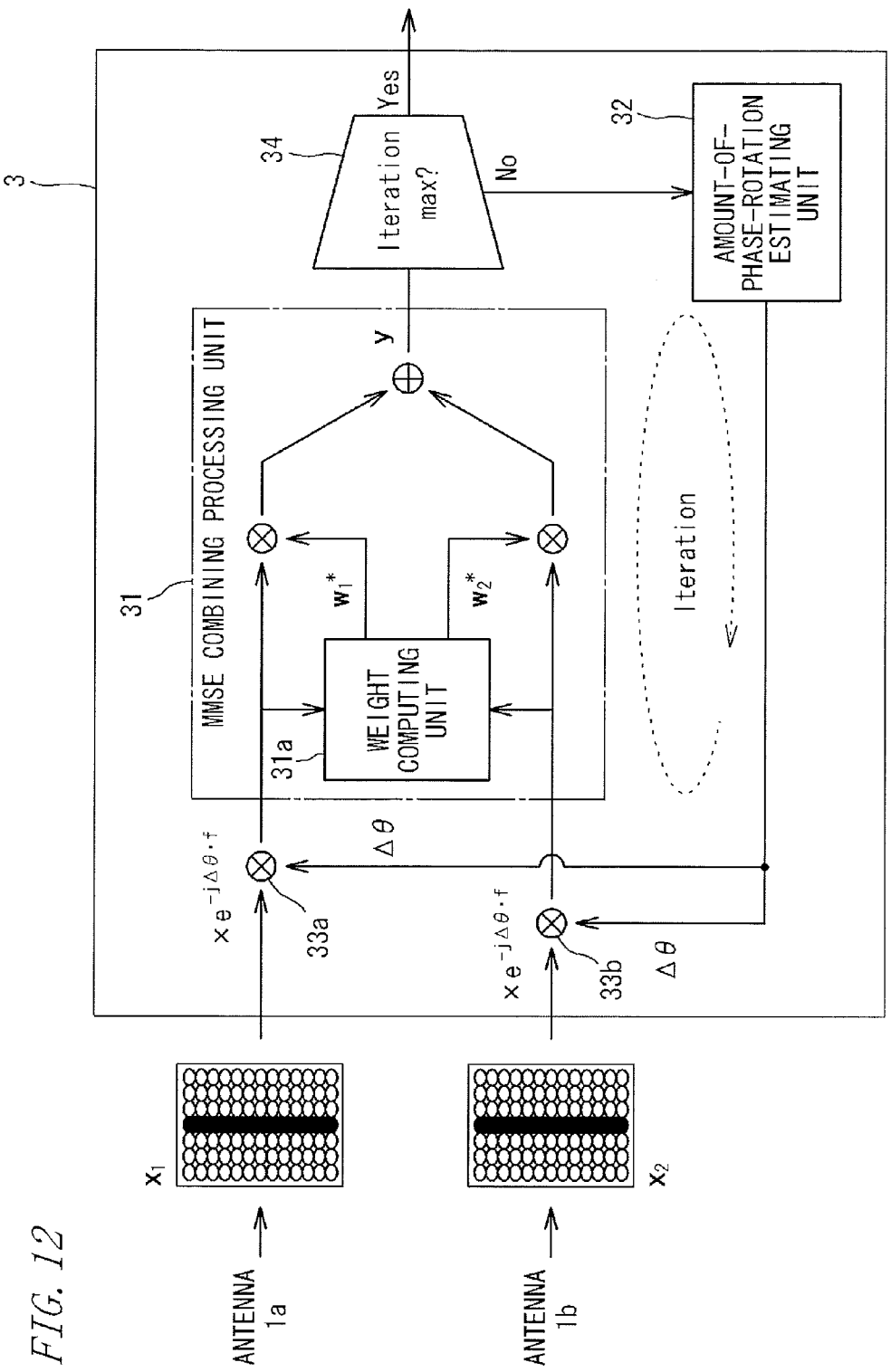
FIG. 12 is a block diagram of a multi-antenna signal processing unit according to a second embodiment.
Figure 13:
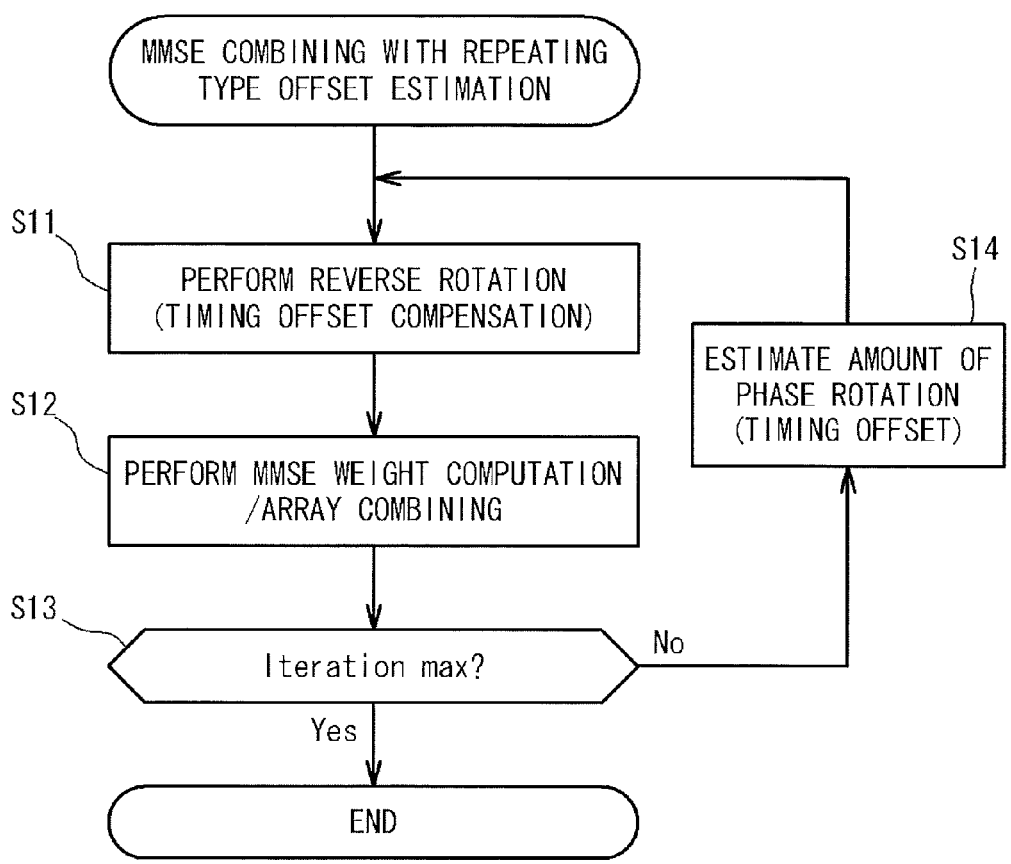
FIG. 13 is a flowchart of an MMSE combining process with repeating type offset estimation.
Figure 14:
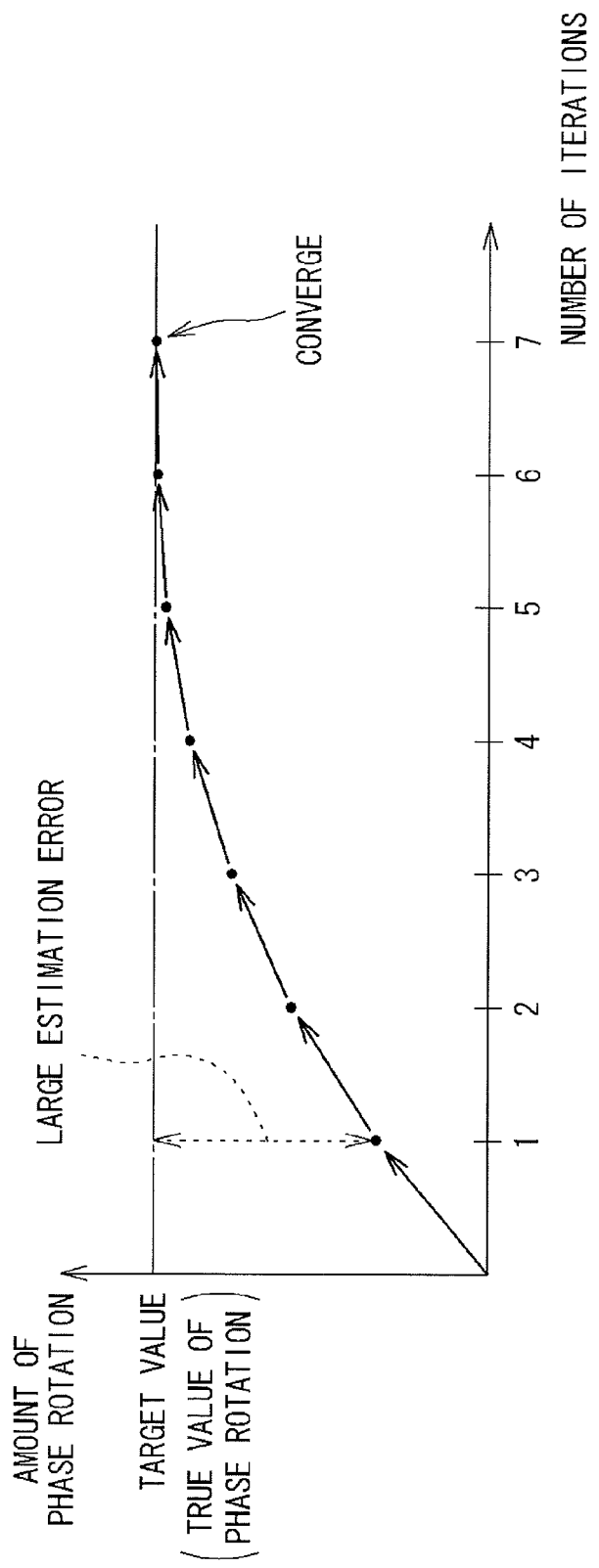
FIG. 14 is a graph showing the amount of phase rotation for when performing a process repeatedly.

FIGS. 12 to 14 show a multi-antenna signal processing unit 3 of a base station apparatus according to the second embodiment. Note that for the second embodiment, for those points whose description is omitted, description made in the first embodiment is incorporated.

In the multi-antenna signal processing unit 3 shown in FIG. 12, estimation of an amount of phase rotation by an amount-of-phase-rotation estimating unit 32 is performed using an output signal y obtained after MMSE combining. By the effect of MMSE combining, the output signal y obtained after the combining is expected to be a more appropriate signal than signals x1 and x2 before the combining. Thus, by estimating an amount of phase rotation $\Delta\theta$ based on the output signal y obtained after the MMSE combining performed once, the estimation accuracy can be increased.

Reverse rotation units 33*a* and 33*b* of the second embodiment apply a reverse rotation of an amount of rotation corresponding to the amount of phase rotation $\Delta\theta$ estimated by the amount-of-phase-rotation estimating unit 32, to the signals obtained before the combining (frequency domain received signals) $x_1$ and $x_2$. Then, an MMSE combining unit 31 performs an MMSE combining process (MMSE weight computation and MMSE combining) again on the signals $x_1$ and $x_2$ to which the reverse rotation has been applied.

FIG. 13 shows a processing procedure in the second embodiment. The first reverse rotation is applied to each of frequency domain signals $x_1$ and $x_2$ (step S11). The amount of reverse phase rotation for the first reverse rotation is any suitable initial value. Alternatively, as in the first embodiment, the amount of reverse phase rotation may be an amount of rotation corresponding to an amount of phase rotation estimated from frequency domain received signals $x_1$ and $x_2$ obtained before combining (in this case, an amount-of-phase-rotation estimating unit that estimates an amount of phase rotation from frequency domain received signals $x_1$ and $x_2$ obtained before combining is also provided).

Then, MMSE weight computation and MMSE weight combining are performed based on the frequency domain signals $x_1$ and $x_2$ having been subjected to the reverse rotation of a predetermined amount (step S12).

Here, if the number of iterations have reached a set number of iterations then the process ends (step S13), and if not reached then the amount-of-phase-rotation estimating unit 32 performs estimation of an amount of phase rotation (step S14).

Estimation of an amount of phase rotation is performed based on an MMSE combined output signal $y_1$.

Then, a reverse rotation of an amount of rotation corresponding to the estimated amount of phase rotation is performed again (step S11). As shown in FIG. 13, a series of these processes are performed until the number of iterations reaches the set number of iterations (or until the estimation value of the amount of phase rotation converges).

By performing the above-described iteration, as shown in FIG. 14, even if there is a large error in the estimation of an amount of phase rotation at an initial stage of the iteration, by repeating a process, the estimation error can be reduced. Therefore, even if the number of pilot signals is small, the estimation accuracy of the amount of phase rotation can be improved.

2.3 Third Embodiment: Determination Feedback Type Offset Estimation

Figure 15:
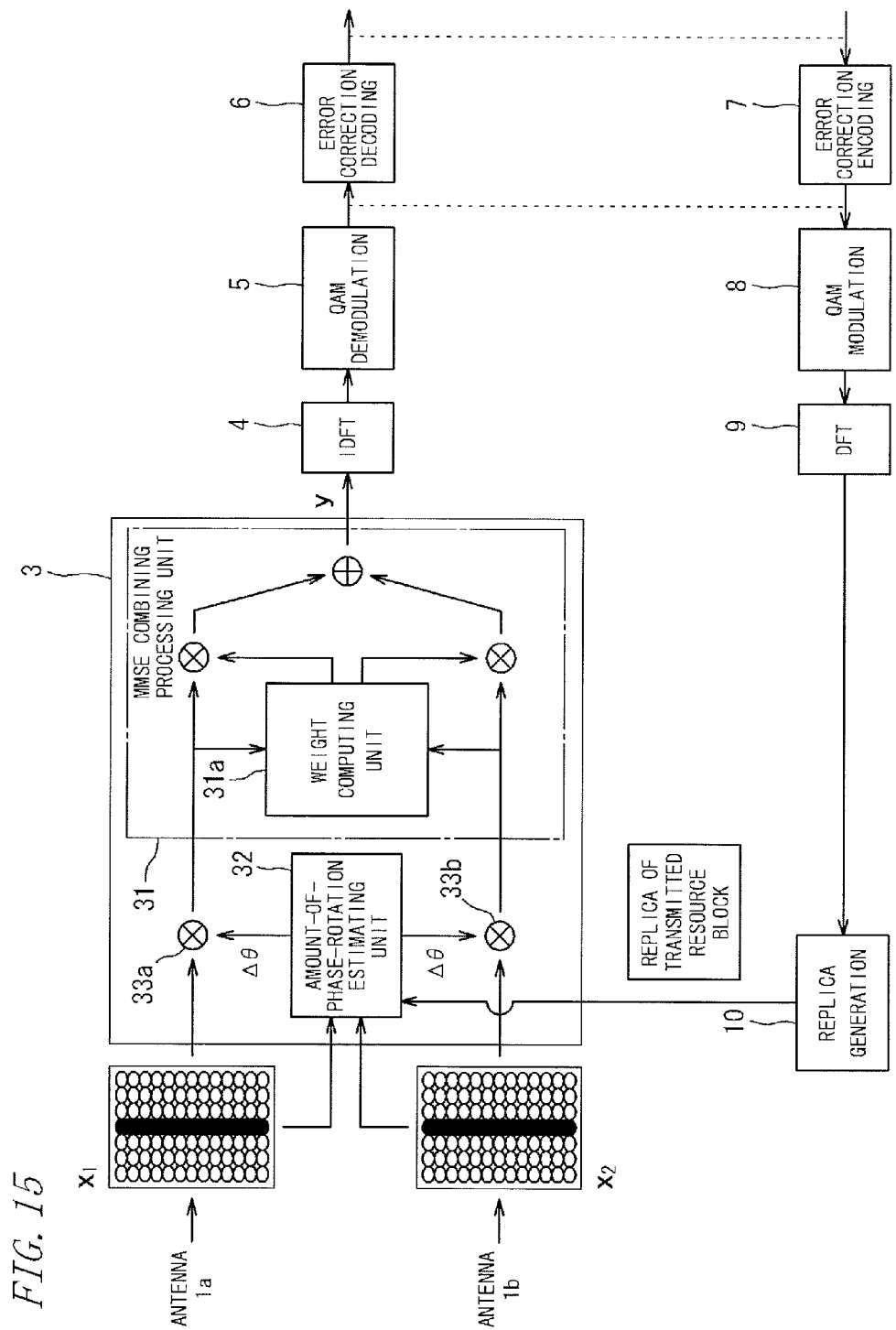
FIG. 15 is a block diagram of a base station apparatus according to a third embodiment.
Figure 16:
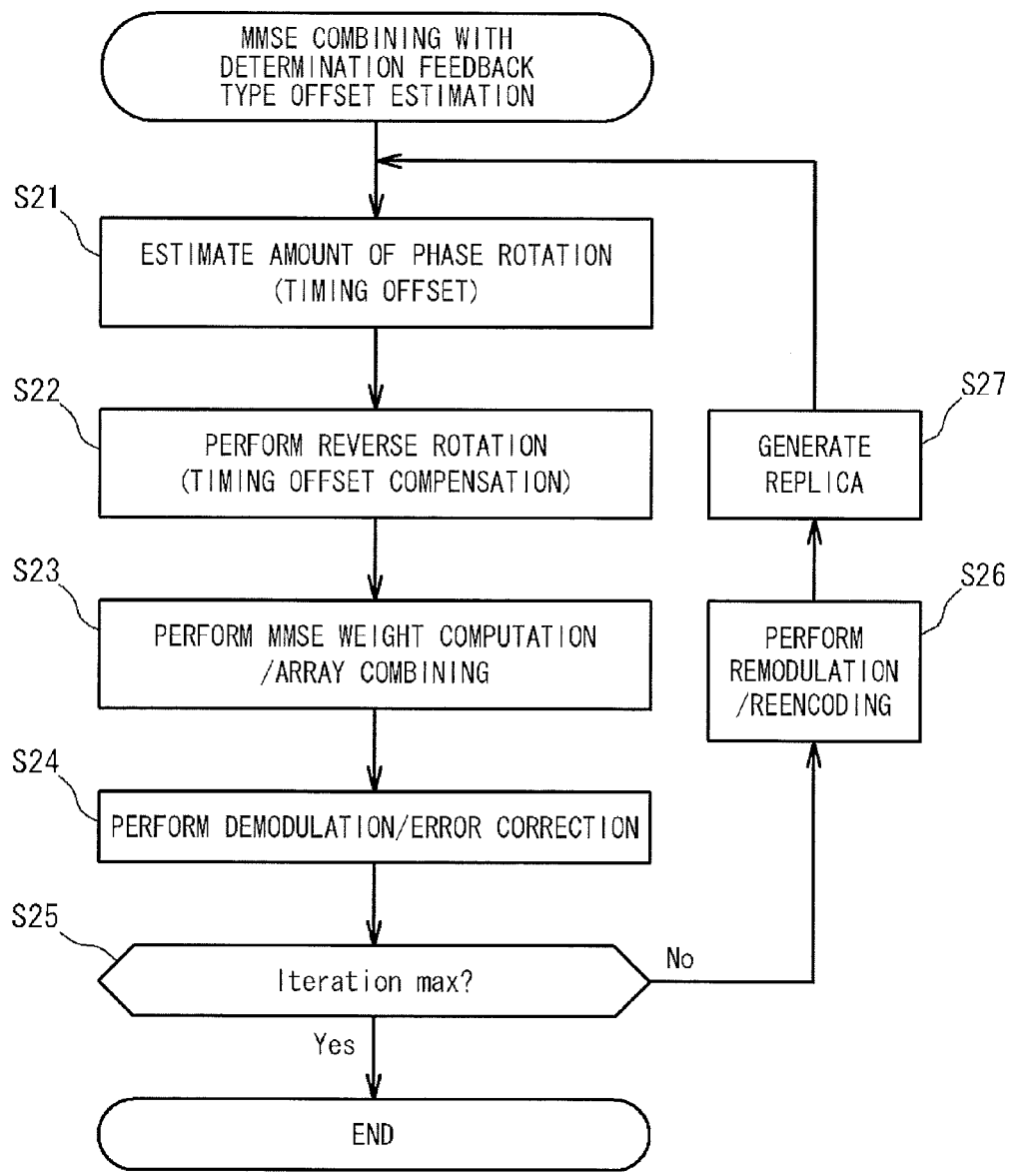
FIG. 16 is a flowchart of an MMSE combining process with determination feedback type offset estimation.
Figure 17:
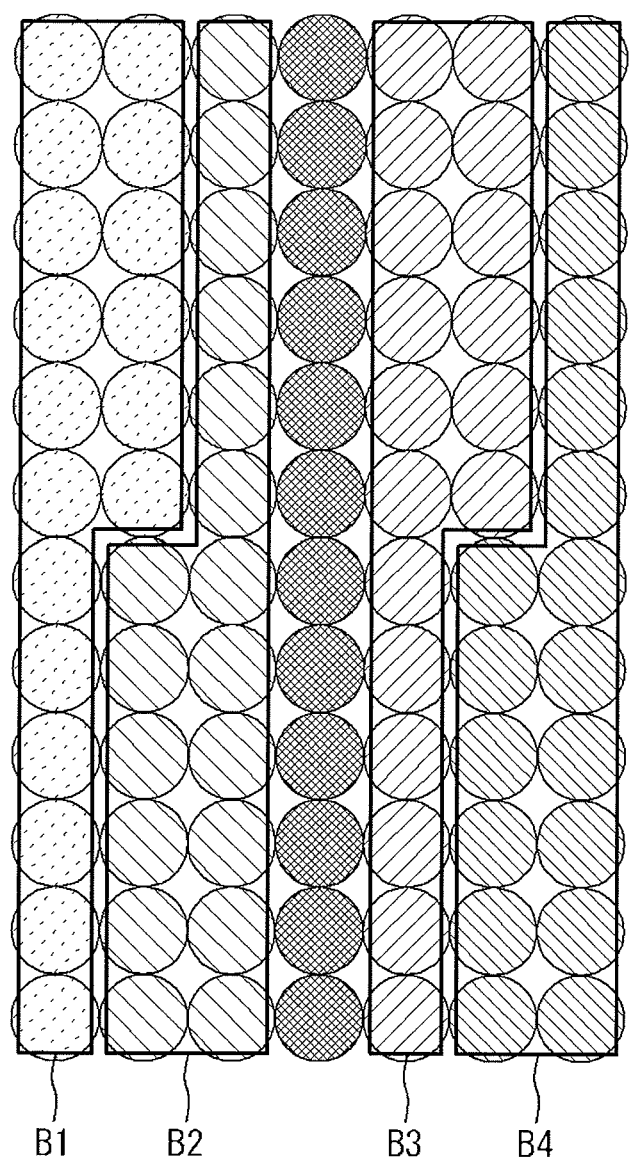
FIG. 17 is a diagram showing error correction units in a resource block.

FIGS. 15 to 17 show a base station apparatus according to the third embodiment. Note that for the third embodiment, for those points whose description is omitted, description made in the first embodiment is incorporated.

In the third embodiment, the base station apparatus includes a multi-antenna signal processing unit 3 which is substantially the same as that of the first embodiment. Note, however, that while an amount-of-phase-rotation estimating unit 32 of the first embodiment estimates an amount of phase rotation using only pilot points where pilot signals are present among frequency domain received signals in a resource block, an amount-of-phase-rotation estimating unit 32 of the third embodiment estimates an amount of phase rotation using not only pilot points but also data points where data signals are present, in the same manner as the pilot points. By this, the same effect as that obtained when the number of pilot points substantially increases can be obtained. Thus, even if the number of original pilot points is small, the estimation accuracy of the amount of phase rotation can be improved.

Specifically, an output signal y (data signal) obtained as a result of MMSE combining is subjected to an inverse discrete Fourier transform by an IDFT 4, thereby obtaining a time domain signal. The time domain signal is demodulated (QAM demodulated) by a demodulating unit 5 and is further modulated (QAM modulated) by a modulating unit 8.

A signal demodulated by the receiver side is supposed to be the same as a signal generated by the transmitter side unless there is error in a transmission line. Therefore, a signal demodulated and remodulated is supposed to be the same as a signal transmitted by the transmitter side (terminal) and thus can be used as a replica of the transmitted signal. The third embodiment utilizes this and thus a remodulated modulated signal is subjected to a discrete Fourier transform by a DFT unit 9 and is thereby transformed into a frequency domain signal.

A replica generating unit 10 uses frequency domain signals (data signals) forming a resource block which is a target of estimation of an amount of phase rotation among frequency domain signals (data signals) outputted from the DFT unit 9, as replicas for a target resource block transmitted by the transmitter side (transmitted signal replicas). Note that since only data signals are a target of demodulation and remodulation and pilot signals are not the target, the replicas for the target resource block include only data signals and do not include pilot signals.

The amount-of-phase-rotation estimating unit 32 considers the frequency domain signals (data signals) included in the resource block replicas, as pilot signals which are known signals. Then, an amount of phase rotation is estimated using the resource block replicas, pilot signals, and the resource block actually received.

In addition, as shown in FIG. 15, a signal obtained after further performing error correction, by an error correction decoding unit 6, on a demodulated signal demodulated by the demodulating unit 5 may be used. In this case, after the error correction decoding 6, encoding is performed again by an error correction encoding unit 7 and then modulation by the modulating unit 8 and a discrete Fourier transform by the DFT unit are performed. By also performing error correction, the estimation accuracy of a replica improves and thus the estimation accuracy of the amount of phase rotation can also be improved.

FIG. 16 shows a processing procedure of MMSE combining in the third embodiment. First, estimation of an amount of phase rotation is performed (step S21). Estimation of an amount of phase rotation is repeated a plurality of times. In the first estimation of an amount of phase rotation, as with the first embodiment, only pilot points in a resource block which is a target of estimation of an amount of phase rotation are used. Therefore, in the first estimation of an amount of phase rotation, a channel estimation value used to determine a mutual correlation is calculated in the same manner as in the first embodiment, as shown in the following equation:

channel estimation value for a pilot point $h_i = x_i$(received signal)$/s_i$(pilot signal):only a pilot point is used  [Equation 10]

Subsequently, a reverse rotation of an amount of rotation corresponding to the amount of phase rotation obtained in the first estimation is applied to frequency domain received signals (step S22). Then, MMSE weight computation and array combining are performed based on the frequency domain received signals to which the reverse rotation has been applied (step S23). Then, demodulation and, if necessary, error correction are performed (step S24).

If the number of repetitions of the above-described process has reached a set maximum value then the process ends (step S25), but if not reached the maximum value then remodulation (if necessary, first, reencoding) is performed (step S26) and a replica of the resource block is generated (step S27).

In the second and subsequent estimations of an amount of phase rotation, a channel estimation value used to determine a mutual correlation is calculated using both a pilot point i and a data point j in the resource block, which is represented by an equation as follows:

$$\left. \begin{array}{l} \text{channel estimation value for} \\ \text{a pilot point} \\ h_i = \dfrac{x_i^{(received\ signal)}}{s_i^{(pilot\ signal)}} \\ \text{channel estimation value for} \\ \text{a data point} \\ h'_j = \dfrac{d_j^{(received\ signal)}}{s'_j{}^{(replica\ signal)}} \end{array} \right\} \begin{array}{l} \text{both of a pilot} \\ \text{point and a data} \\ \text{point are used} \end{array} \quad [\text{Equation 11}]$$

As shown in the above-described equation, for the data point, channel estimation is performed based on a frequency domain signal for a data signal included in the resource block replica and an actual received signal for the data signal. That is, each data signal in the resource block replica is considered as a pilot signal.

Therefore, in the case of using all pilot points and all data points, the same estimation accuracy as that obtained when there are 12×7 (or 6) pilot points can be obtained.

In addition, in the third embodiment, since the number of pilot points is increased, as compared to the second embodiment, even at an initial stage of the repetition of the process, an amount of phase rotation can be estimated with a relatively high degree of accuracy. Namely, only by the second estimation of an amount of phase rotation and a reverse rotation performed using the value of the estimation, relatively excellent MMSE combining can be performed. Note that the third and subsequent estimations of an amount of phase rotation can, of course, be performed.

In the case of generating a replica based on a signal obtained by performing error correction, it is preferred not to use, as a replica, a data point corresponding to a bit whose error has not been able to be corrected.

For example, it is assumed that a single resource block is divided into four blocks, B1 to B4, shown in FIG. 17, as the units of performing error correction. Then, it is assumed that, of the four blocks B1 to B4, error has been able to be corrected in the blocks B1, B3, and B4, but error has not been able to be corrected in the block B2 despite error being detected in the block B2.

In this case, the amount-of-phase-rotation estimating unit 32 estimates an amount of phase rotation, excluding the data points in the block B2. Since received signals at the data points in the block B2 include error, the estimation accuracy of a replica is low and thus using the data points for estimation of an amount of phase rotation decreases the estimation accuracy. However, by excluding the block B2 with error, a decrease in estimation accuracy can be prevented.

When only error detection but not error correction is performed, the block B2 in which error has been detected can be excluded likewise.

3. Fourth Embodiment

Figure 18:
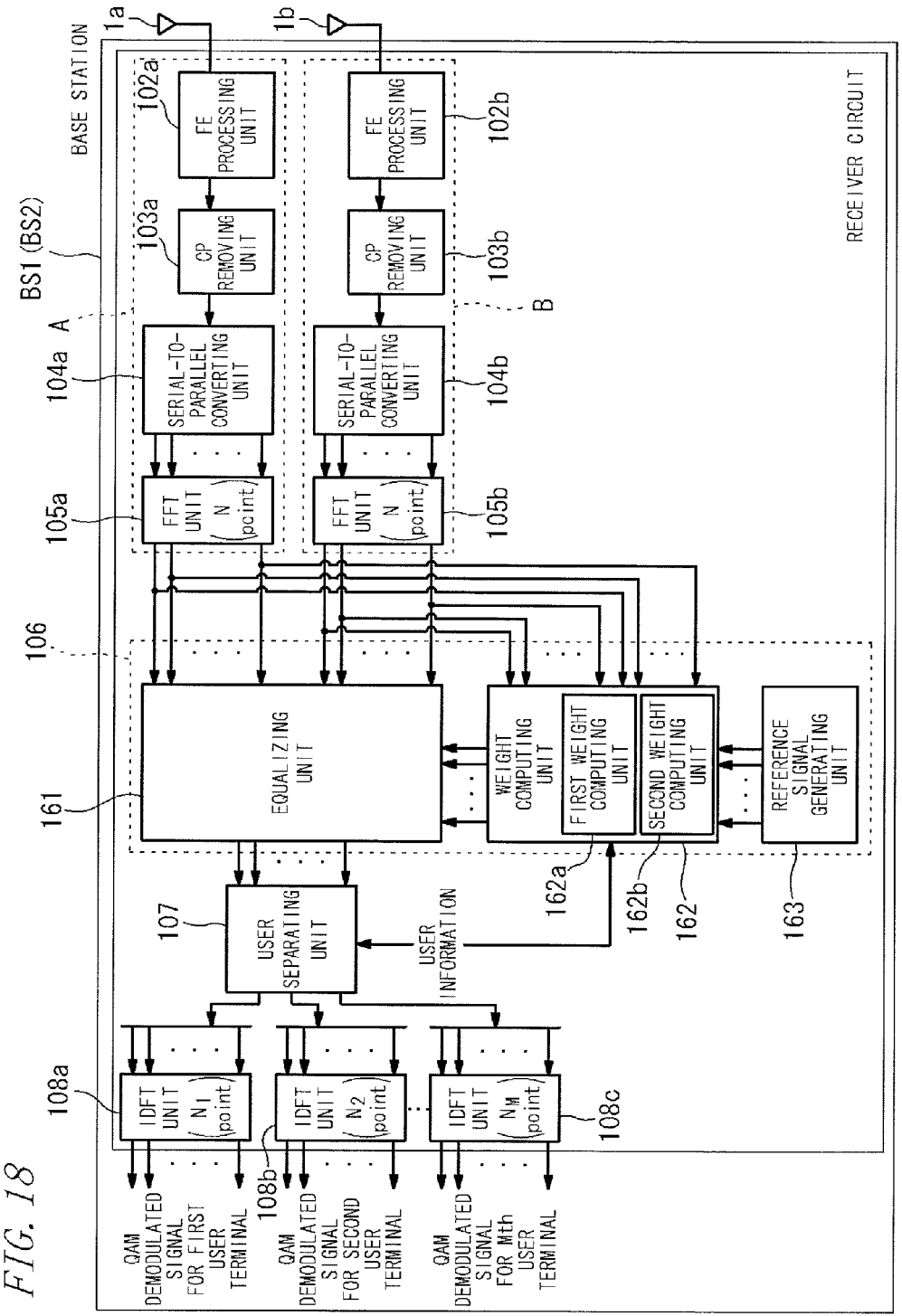
FIG. 18 is a block diagram of a base station apparatus according to a fourth embodiment.

FIG. 18 shows a receiver circuit in each of base station apparatuses BS1 and BS2 according to a fourth embodiment. The receiver circuit supports a plurality of users and thus can output modulated signals (QAM modulated signals; QAM modulated data symbols) for a plurality of users. Note that for the fourth embodiment, for those points whose description is omitted, description made in the first to third embodiments is incorporated.

This base station apparatus has a plurality of antennas (two antennas in FIG. 18) 1a and 1b to perform multi-antenna signal processing such as adaptive array.

The base station apparatus further has processing sequences A and B, the number of which corresponds to the number of the antennas 1a and 1b. Received signals received by the respective antennas 1a and 1b can be transformed into frequency domain signals by the respective processing sequences A and B provided for the respective antennas.

The processing sequences A and B respectively include FE processing units 102a and 102b, CP removing units 103a and 103b, serial-to-parallel converting units 104a and 104b, and FFT units 105a and 105b.

The FE processing units 102a and 102b perform an FE process (frequency conversion, A/D conversion, etc.) on signals (SC-FDMA signals) received by the respective antennas 1a and 1b.

Subsequently, each of the CP removing units 103a and 103b performs CP removal.

The received signals from which CPs have been removed are converted into parallel signals by the serial-to-parallel converting units 104a and 104b, respectively. Thereafter, the parallel signals are subjected to an N-point FFT (Fast Fourier Transform) by the FFT units 105a and 105b, respectively, and are thereby transformed into frequency domain signals.

The FFT units 105a and 105b in the processing sequences A and B each output a frequency domain signal for all communication frequency bands (all frequency bands for uplink communication) of the base station apparatus. That is, in the frequency domain signal outputted from each of the processing sequences A and B, SC-FDMA signals for a plurality of users are not demultiplexed and thus the frequency domain signal still includes signals for the plurality of users.

A plurality of frequency domain SC-FDMA signals outputted from the plurality of processing sequences A and B are provided to a single multi-antenna signal processing unit 106, with the frequency domain SC-FDMA signals still including signals for the plurality of users.

The multi-antenna signal processing unit 106 performs adaptive array signal processing on the plurality of frequency domain signals received by the plurality of antennas 1a and 1b in the frequency domain, and thereby array combines the signals, and outputs a single signal as a processing result. As such, the multi-antenna signal processing unit 106 configures an array antenna system.

When the multi-antenna signal processing unit 106 performs multi-antenna signal processing by an adaptive array scheme, interference waves from a mobile station MS3 in another cell which is an interfering station (see FIG. 1) are removed, enabling to improve reception quality. Note that in the adaptive array scheme the receiver side computes array combining weights using known signals (reference signals).

Adaptive array includes MMSE adaptive array in which a weight w at which error power (mean square error) between a combined output signal and a desired signal becomes minimum is applied.

Since the MMSE adaptive array scheme has interference wave removal capability, even when the interference wave component of a received signal is large, the reception quality can be improved. That is, in the case of a communication system with a cell configuration such as that in FIG. 1, the base station apparatus BS1 may receive interference waves from the mobile station MS3 in another cell; however, with the MMSE scheme, interference waves from another cell can be removed.

Array combining weights are computed by a weight computing unit 162, using an algorithm which will be described later. The weight computing unit 162 computes a weight on an area-by-area basis, the area being guaranteed to be provided for the same user (a two-dimensional area represented by the time axis and the frequency axis; see FIG. 3). Hence, the weight computing unit 162 computes an array combining weight on a resource-block-by-resource-block basis, the resource block being a minimum unit of resource allocation to users, and eventually determines array combining weights for all communication frequency bands (all frequency bands for uplink communication) of the base station apparatus.

By determining a weight on a resource-block-by-resource-block basis, the resource block being a minimum unit of resource allocation to users, a weight can be computed using only reference signals transmitted from the same user, and thus, a weight can be prevented from being inappropriately computed using reference signals transmitted from a different user. Note that this point will be described later.

Each of the plurality of frequency domain SC-FDMA signals is provided to an equalizing unit 161 in the processing unit 106. In the equalizing unit 161, each of the plurality of SC-FDMA signals, each still including signals for the plural-ity of users, is added up with the weights computed for all communication frequency bands (all frequency bands for uplink communication) of the base station apparatus, and the signals are array combined.

FIG. 19(a) shows a frequency domain signal outputted from the equalizing unit 161. The signal is demultiplexed by a user separating unit 107 into signals for respective users (FIG. 19(b) to FIG. 19(d)). The user separating unit 107 performs user separation of the frequency domain signal, based on user information indicating frequency allocation to the users (user allocation information in the SC-FDMA scheme).

For example, it is assumed that, in communication frequency bands, frequency allocation to a first user terminal MS1, a second user terminal MS2, and a third user terminal MS3 is as shown in FIG. 19(a). Note that, in FIG. 19(a), the first user terminal MS1 is allocated a band for $N_1$ subcarriers, the second user terminal MS2 is allocated a band for $N_2$ subcarriers, and the third user terminal MS3 is allocated a band for $N_3$ subcarriers.

The user separating unit 107 demultiplexes, as shown in FIG. 19(b) to FIG. 19(d), the frequency domain signal shown in FIG. 19(a) into signals for the respective users, based on user information indicating the above-described frequency allocation.

The signals (frequency domain signals) for the respective users outputted from the user separating unit 107 are subjected to an Inverse Discrete Fourier Transform (IDFT) by IDFT units 108a, 108b, and 108c which are provided for the respective users. The IDFT units 108a, 108b, and 108c transform the frequency domain signals for the respective users into time domain QAM demodulated signals. Note that the number of IDFT points at demodulation is according to the sizes of bands $N_1$, $N_2$, and $N_3$ allocated to the respective users.

Meanwhile, when the weight computing unit 162 computes array combining weights, in the present embodiment, as described above, an array combining weight is determined on a resource block basis.

Figure 20:
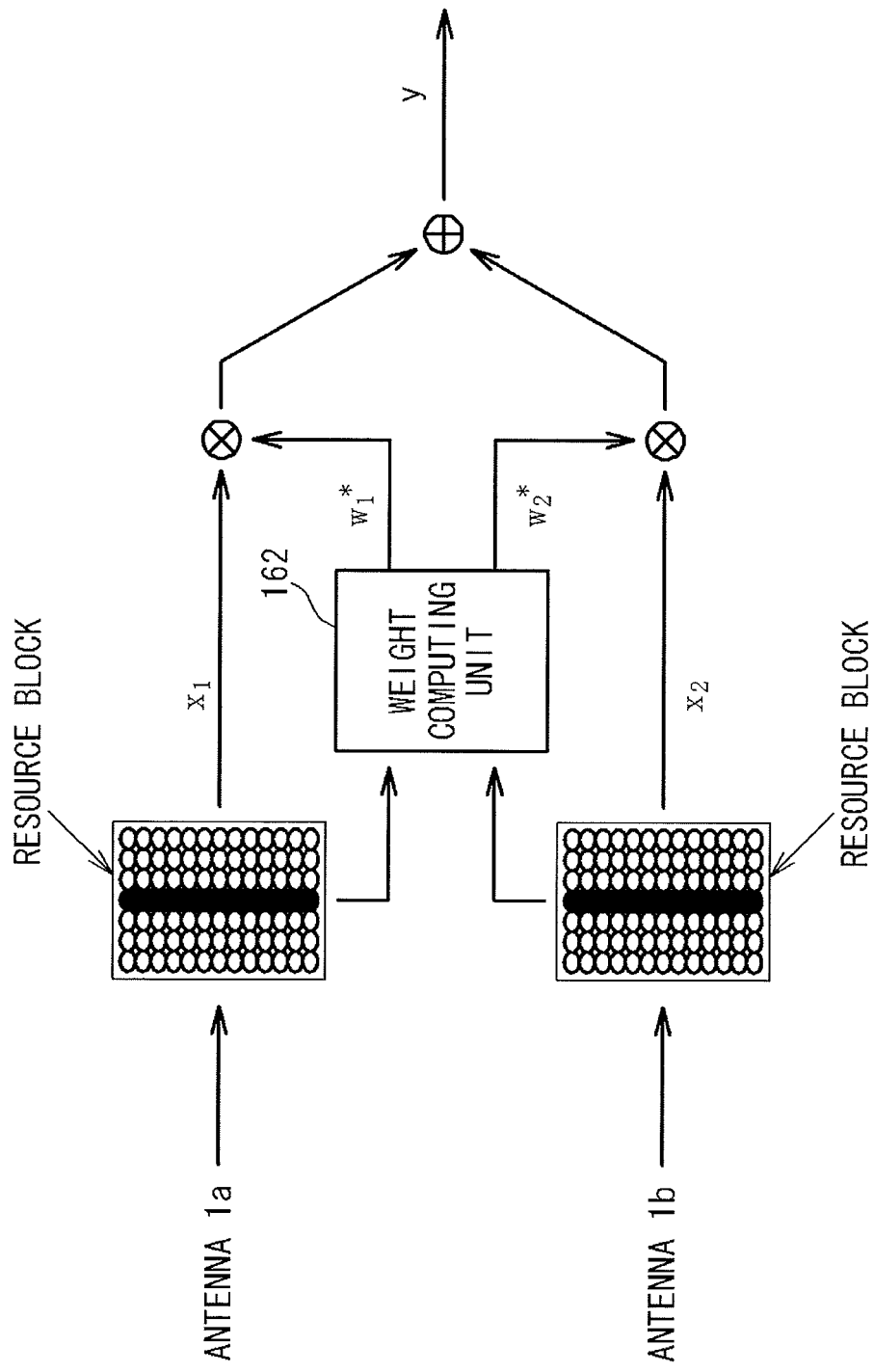
FIG. 20 is a conceptual diagram of array combining.

FIG. 20 is a conceptual diagram of MMSE array combining in the case of two antennas. Note that in FIG. 20, too, an amount-of-phase-rotation estimating unit 32 and reverse rotation units 33a and 33 shown in FIG. 5 may be provided. Note also that in FIG. 20 the configuration shown in FIG. 12 or 15 may be adopted.

In array combining shown in FIG. 20, as shown in the following equation, received signals $x_1$ and $x_2$ received by the respective antennas 1a and 1b are multiplied by weights $w_1^*$ and $w_2^*$ computed by the weight computing unit 162, whereby a combined output y is obtained.

$$y = \sum_i w_i^* \cdot x_i \quad \text{[Equation 12]}$$

$w_i^*$ represents the complex conjugate of $w_i$.

Figure 22:
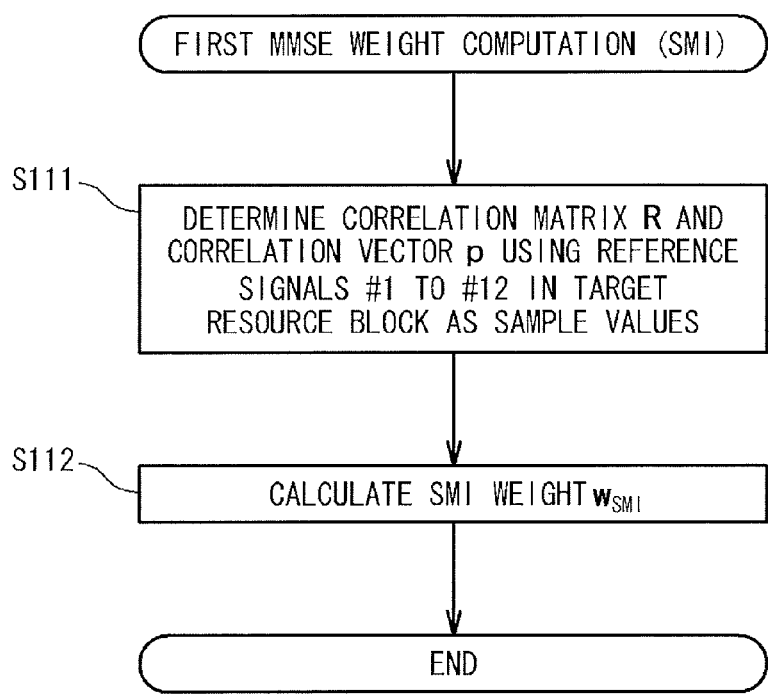
FIG. 22 is a flowchart of the first MMSE weight computation process.
Figure 23:
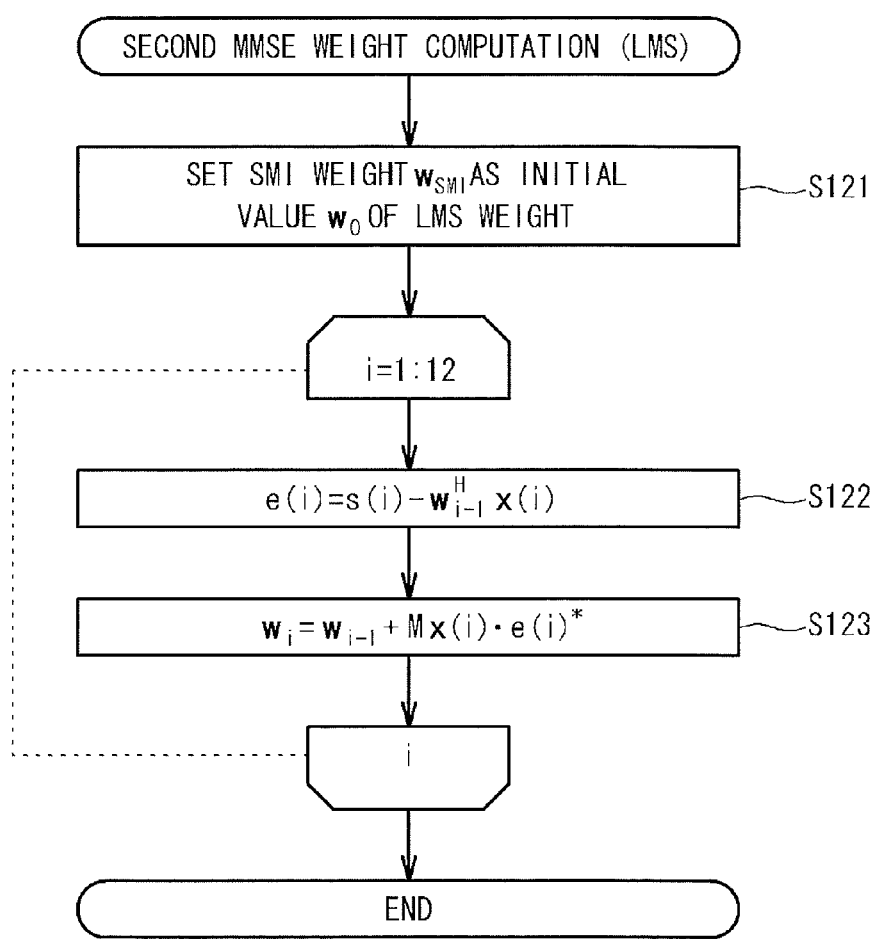
FIG. 23 is a flowchart of the second MMSE weight computation process.

In an MMSE array combining scheme, an array combining weight is determined at which mean square error between an actual combined output y obtained by the above-described equation and a desired signal becomes minimum. The weight computing unit 62 of the present embodiment computes the weight according to algorithms shown in FIGS. 21 to 23. Note that the algorithms shown in FIGS. 21 to 23 are performed for each resource block.

Figure 21:
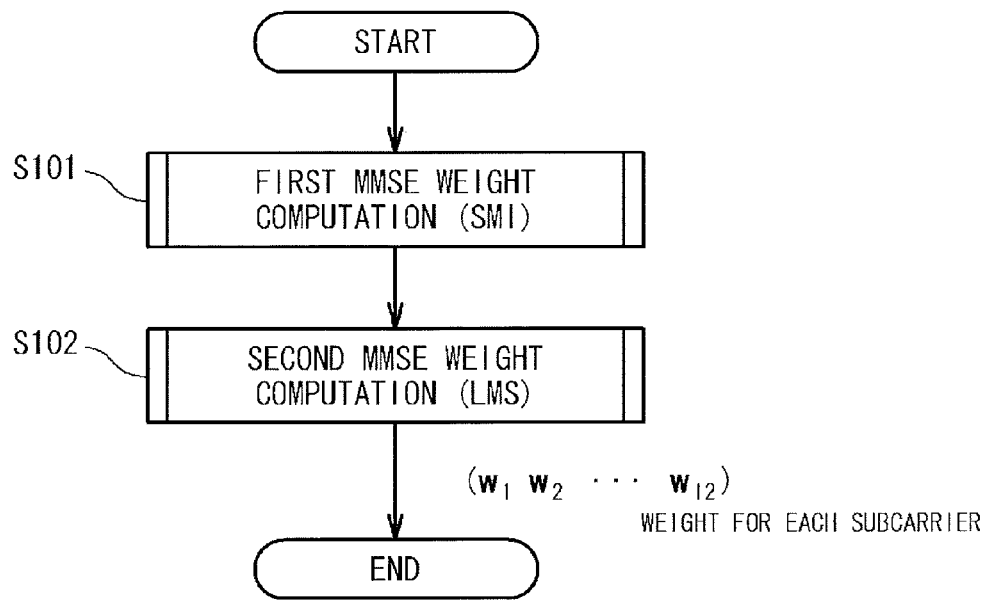
FIG. 21 is a flowchart of a weight computation process.

In the weight computing unit 162, as shown in FIG. 21, first, a first weight computing unit 162a in the weight computing unit 162 performs the first MMSE weight computation and thereby determines an initial weight (step S101). Furthermore, a second weight computing unit 162b in the weight computing unit 162 performs the second MMSE weight computation based on the initial weight and thereby determines an array combining weight (step S102).

In the present embodiment, the first MMSE weight computation (step S101) is performed by an SMI algorithm. Here, only received signals (received subcarriers) included in a target resource block which is a target of determining a weight are used as sample values (input data for weight computation) for the SMI algorithm. That is, received signals included in another resource block that is possibly used by another user (terminal) are not used as sample values for calculating a weight for the target resource block.

The first weight computing unit 162 calculates, based on the following equation, a single SMI weight vector $w_{SMI} = [w_1, \ldots, w_m]$ (m is the number of antennas) for the target resource block, using, as sample values, actual received signal vectors x for respective 12 reference signals from #1 to #12 included in the target resource block (signals located at symbol number=3). Note that a desired signal (reference signal) s used with a sample value when computing a weight is generated by a reference signal generating unit 63 as shown in FIG. 18.

Note that although in the present embodiment the actual received signal vectors x for all of the 12 reference signals from #1 to #12 included in the target resource block are used as sample values, if a slight degradation in accuracy is allowable, then only some of those 12 vectors x may be used as sample values.

FIG. 22 shows a weight computation procedure performed by the first weight computing unit 162. First, a correlation matrix R and a correlation vector p are calculated based on the following equation, using actual received signal vectors x for reference signals in a target resource block, as sample values (step S111).

$$R = \frac{1}{N}\sum_{i=1}^{N} x(i) \cdot x(i)^H$$

$$p = \frac{1}{N}\sum_{i=1}^{N} x(i) \cdot s(i)^*$$

[Equation 13]

$x(i)^H$ represents the complex conjugate transpose of x(i).
$s(i)^*$ represents the complex conjugate of s(i).

Then, the correlation matrix R and the correlation vector p are substituted into the following equation, whereby a single SMI weight vector $w_{SMI} = [w_1, \ldots, w_m]$ (m is the number of antennas) for the target resource block is calculated.

$$w_{SMI} = R^{-1} p$$

[Equation 14]

In the weight computation in step S101, received signals for reference signals included in another resource block that is possibly used by another user (terminal) are not used as sample values. Therefore, without being affected by an optimal weight for another user using another resource block, a relatively appropriate weight $w_{SMI}$ for the entire target resource block can be calculated.

Moreover, in the SMI algorithm, unlike sequential update type algorithms such as LMS, a weight can be accurately calculated even with a relatively small number of sample values. Therefore, even when, as in the present embodiment, a weight is calculated using only reference signals in a relatively small area such as a resource block, a weight (initial weight) with a relatively high degree of accuracy can be calculated.

Subsequently, the second weight computation in step S102 is performed. In the second weight computation, computation is performed by an LMS algorithm which is one of the sequential update type algorithms. Note that as a sequential update type algorithm, for example, an RLS algorithm may be used.

In the second weight computation, as shown in FIG. 23, first, the SMI weight vector (initial weight vector) $w_{SMI}$ determined in the first weight computation is set as an initial value $w_0$ of an LMS weight vector calculated by the LMS algorithm.

Then, the second weight computing unit 162b sequentially updates the initial value $w_0$, using, as sample values, the actual received signal vectors x for the 12 reference signals (subcarrier numbers #1 to #12) included in the same target resource block as that used for the first weight computation, whereby 12 array combining weight vectors $w_1$ to $w_{12}$ are determined (an iteration loop of steps S122 and S123).

Here, steps S122 and S123 in FIG. 23 show a single weight update equation in the LMS algorithm. Here, the variable "i" used in the iteration of steps S123 and 123 represents the subcarrier numbers (#1 to #12) of the reference signals included in the resource block. In this case, in the iteration loop, when i=1, a received signal for a reference signal with subcarrier number #1 in the target resource block is a sample value x(1) and a weight vector $w_1$ is determined by computations in steps S122 and 123. The weight vector $w_1$ serves as an array combining weight vector for the received signal for the reference signal with subcarrier number #1.

Likewise, when i=2, a received signal for a reference signal with subcarrier number #2 in the target resource block is a sample value x(2) and a weight vector $w_2$ is determined by computations in steps S122 and 123. The weight vector $w_2$ serves as an array combining weight vector for the received signal for the reference signal with subcarrier number #2.

Furthermore, for the rest, likewise, array combining weight vectors $w_3$ to $w_{12}$ for received signals for received signals for the respective reference signals (subcarrier numbers #3 to #12) are determined.

Note that although, in the present embodiment, upon the second weight computation, the received signals for all the reference signals in the target resource block are used as sample values, some of the reference signals may be used as sample values. Note also that it is sufficient that sample values used for the first and second weight computations be present in the same resource block, and it is not necessary that sample values used for those computations partly or wholly match.

The advantage of performing the second weight computation in the present embodiment is as follows. Specifically, although in the weight computation in step S101, a single weight vector $w_{SMI}$ as viewed from one entire target resource block is calculated, in practice, an optimal weight is not always the same for all the subcarriers #1 to #12 in the target resource block.

For example, it is assumed that the reception levels of respective actual received signals for reference signals with subcarrier numbers #1 to #12 (at the locations with symbol number=3) shown in FIG. 24(a) are as shown in FIG. 24(b). FIG. 24(b) shows that as the subcarrier number proceeds from #1 to #12, the reception level gradually decreases. As such, even in the same resource block, depending on the communication environment, the reception level varies by frequency (subcarrier).

In the case of the reception levels shown in FIG. 24(b), an optimal weight varies from subcarrier to subcarrier, as shown in FIG. 24(c). However, since in the SMI algorithm only one weight (weight vector) can be computed per weight computation unit (here, a resource block), fluctuations in optimal weight in the unit cannot be dealt with. To deal with such fluctuations in weight, rather than determining a single weight per unit, a weight should be calculated more minutely.

Hence, by determining weights for the respective reference signals included in the resource block, as does the second weight computation, fluctuations in weight in the resource block such as those described above can be dealt with.

Note, however, that if weights are determined only by a sequential update type algorithm without performing the first weight computation, then appropriate weights are not always obtained. The sequential update type algorithm requires a relatively large number of sample values to converge to an optimal weight, and thus, with a relatively small number of samples there is no guarantee to converge to an optimal weight. For example, in the case of the LMS algorithm, as shown in FIG. 24(c), even though a weight converges with 12 samples or so in the resource block, a weight obtained at an initial weight update (e.g., the first or second weight update (i=1, 2) has a large error with respect to an optimal weight and thus is not an appropriate weight.

That is, when, as in the present embodiment, a weight is determined per small area unit such as a resource block unit, an appropriate weight cannot be determined for each reference signal only by the sequential update type algorithm.

On the other hand, in the present embodiment (SMI+LMS algorithms), an SMI weight determined from a target resource block is set as an initial weight for the sequential update type algorithm. As shown in FIG. 24(c), since an SMI weight which is relatively appropriate from the viewpoint of the entire target resource block is an initial weight, even at an initial weight update in the sequential update type algorithm, a more appropriate weight having a small error with respect to an optimal weight can be obtained.

As such, in the present embodiment, even if a weight is determined on a resource block basis, a weight for each reference signal (subcarrier) in a resource block can be appropriately determined.

Upon array combining of a data signal in a resource block, an array combining weight for a reference signal of the same frequency as the data signal may be used, or an array combining weight for a data signal may be separately determined from an array combining weight for a reference signal by an interpolation process, etc., and used.

Note that the first weight computation is not limited to the SMI algorithm and the algorithm may be any as long as a weight is directly computed on a block basis. Note that the SMI algorithm includes, as a matter of course, its modification and extension algorithms.

Note also that the second weight computation may be any algorithm of a sequential update type and may be, for example, RLS, NLMS, an affine projection method, the Kalman filter, etc.

Furthermore, a weight determination unit is not limited to a minimum unit of resource allocation to users (resource block) and may be a plurality of resource blocks as long as the unit is an area allocated to the same user. Note that an area allocated to the same user can be determined based on information on resource allocation to users which is determined by base station apparatuses.

In addition, in the fourth embodiment, too, as with the first to third embodiments, a decrease in weight calculation accuracy can be prevented by applying a reverse rotation of an amount of rotation corresponding to an estimation value of an amount of phase rotation, and thus, a more appropriate weight can be calculated.

4. Resource-Block-by-Resource-Block Weight Calculation

Figure 25:
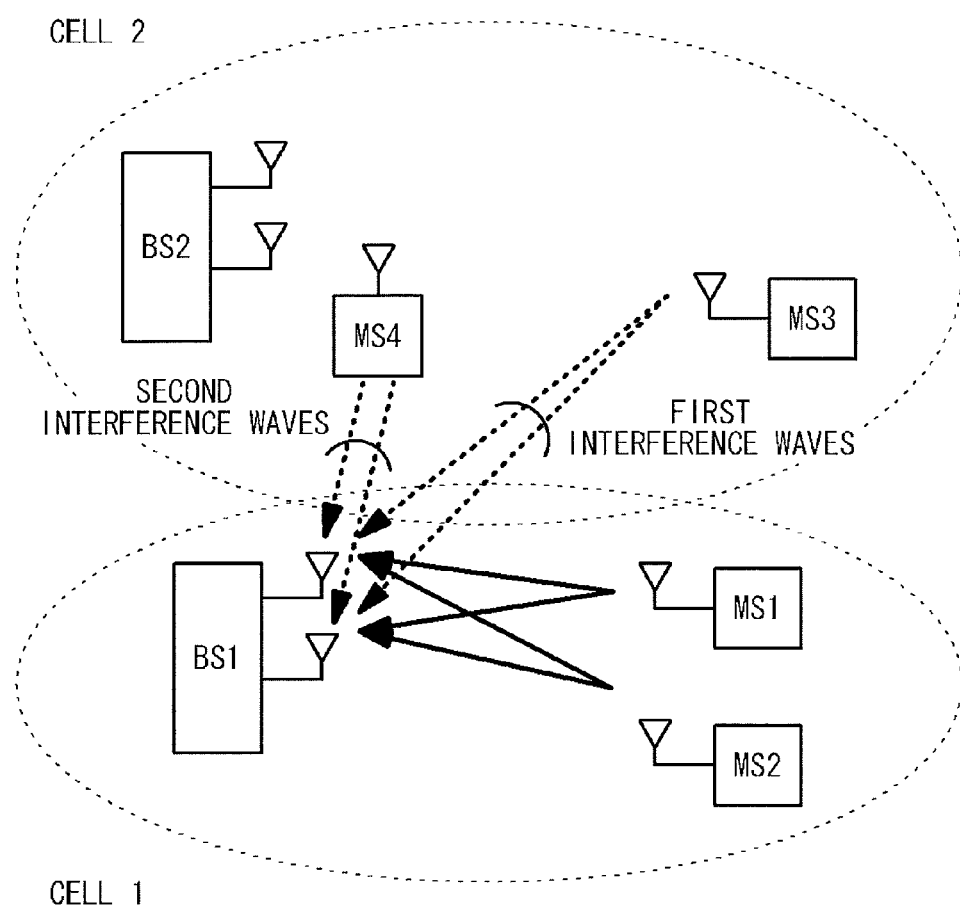
FIG. 25 is a diagram showing how desired waves and interference waves arrive.
Figure 26:
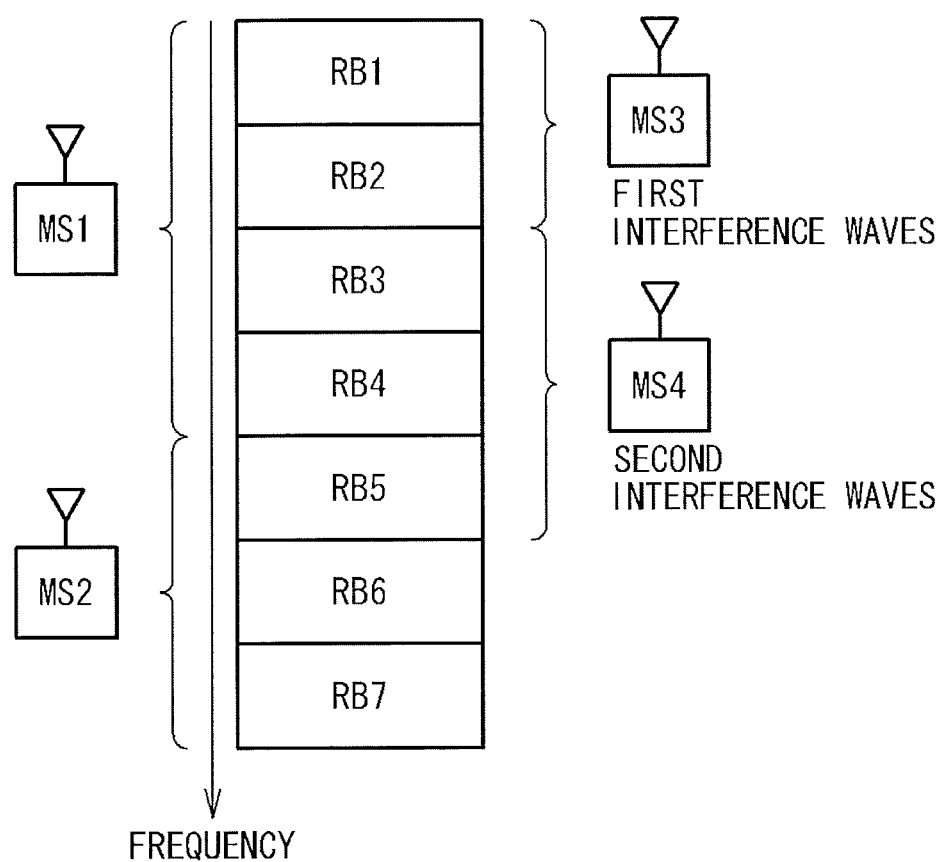
FIG. 26 is a diagram showing bands for desired waves and interference waves.

FIGS. 25 and 26 show the advantage of calculating a weight on a resource-block-by-resource-block basis, the resource block being a minimum unit of user allocation. In FIG. 25, a base station apparatus BS1 is in a state of receiving not only signals (desired signals) from desired terminals MS1 and MS2 present in its cell (cell 1), but also interference signals (first interference signals and second interference signals) from interfering terminals MS3 and MS4 present in another cell (cell 2).

Here, it is assumed that, as shown in FIG. 26, the base station apparatus BS1 allocates, among seven resource blocks RB1 to RB7, RB1 to RB4 to the desired terminal MS1 present in its cell and allocates RB5 to RB7 to the desired terminal MS2.

In addition, it is assumed that RB1 and RB2 are allocated to the interfering terminal MS3, and RB3 to RB5 are allocated to the interfering terminal MS4.

In this case, when it is attempted to calculate weights on a user (desired terminal) basis, a plurality of interference waves may be included and thus interference removal may not be able to be appropriately performed. For example, of the four resource blocks RB1 to RB4 allocated to the desired terminal MS1, RB1 and RB2 have first interference waves from the interfering terminal MS1, and RB3 and RB4 have second interference waves from the interfering terminal MS2. Since the first interference waves and the second interference waves arrive from different directions, to appropriately perform interference removal, different weights should be used for different interference wave bands. Thus, with the weights calculated on a user basis, interference removal cannot be appropriately performed.

However, the base station apparatus BS1 needs to grasp interference wave bands, i.e., user allocation information for another cell (cell 2).

On the other hand, in each of the above-described embodiments, as shown below, weights are calculated on a minimum user allocation (resource block) basis, but not on a user basis.

[Equation 15]

weights on a user basis     $(w_1^{user\,1}, w_2^{user\,1}), (w_1^{user\,2}, w_2^{user\,2})$

weights on an RB basis     $(w_1^{RB\,1}, w_2^{RB\,1})...(w_1^{RB\,7}, w_2^{RB\,7})$ When weights are calculated on a minimum user allocation (resource block) basis, even if interference wave bands are not known, interference removal can be appropriately performed.

It is to be noted that the embodiments disclosed herein are to be considered in all respects as illustrative and not restrictive. The scope of the present invention is indicated by the appended claims rather than by the foregoing meaning, and all changes which come within the meanings and range of equivalency of the claims are therefore intended to be embraced therein.

REFERENCE SIGNS LIST

BS1 and BS2: BASE STATION APPARATUS (WIRELESS COMMUNICATION APPARATUS)
MS1, MS2, and MS3: MOBILE STATION (USER TERMINAL)
1a and 1b: ANTENNA
2a and 2b: FFT UNIT
3: MULTI-ANTENNA SIGNAL PROCESSING UNIT
4: USER SEPARATION & IDFT UNIT (IDFT UNIT)
5: DEMODULATING UNIT
6: ERROR CORRECTION DECODING UNIT
7: ERROR CORRECTION ENCODING UNIT
8: MODULATING UNIT
9: DFT UNIT
10: REPLICA GENERATING UNIT
31: MMSE COMBINING PROCESSING UNIT
31a: WEIGHT COMPUTING UNIT
32: AMOUNT-OF-PHASE-ROTATION ESTIMATING UNIT
33a and 33b: REVERSE ROTATION UNIT
102a and 102b: FE PROCESSING UNIT
103a and 103b: CP REMOVING UNIT
104a and 104b: SERIAL-TO-PARALLEL CONVERTING UNIT
105a and 105b: FFT UNIT
106: PROCESSING UNIT
161: EQUALIZING UNIT
162: WEIGHT COMPUTING UNIT
162a: FIRST WEIGHT COMPUTING UNIT
162b: SECOND WEIGHT COMPUTING UNIT
163: REFERENCE SIGNAL GENERATING UNIT
107: USER SEPARATING UNIT
810a, 108b, and 108c: IDFT UNIT

The invention claimed is:

1. A wireless communication apparatus including an MMSE combining processing unit that performs MMSE combining based on frequency domain received signals obtained by performing a discrete Fourier transform on received signals, the apparatus comprising:
an amount-of-phase-rotation estimating unit that estimates an amount of phase rotation occurring in the frequency domain received signals due to a shift in discrete Fourier transform timing of the received signals using pilot signals included in only a minimum unit of resource allocation to a user in a multiple access scheme; and
a reverse rotation unit that applies a reverse rotation of an amount of rotation corresponding to the amount of phase rotation estimated by the amount-of-phase-rotation estimating unit, to the frequency domain received signals, wherein
the MMSE combining processing unit computes an MMSE weight based on the frequency domain received signals to which the reverse rotation has been applied by the reverse rotation unit, and performs MMSE combining, and wherein
the amount-of-phase-rotation estimating unit calculates the amount of phase rotation by calculating a mutual correlation at a different distance between pilots about the plural pilot signals included in a same minimum unit of resource allocation.

2. The wireless communication apparatus according to claim 1, wherein
the amount-of-phase-rotation estimating unit is configured to estimate an amount of phase rotation based on a frequency domain received signal obtained after MMSE combining performed once,
the reverse rotation unit is configured to apply a reverse rotation of an amount of rotation corresponding to the amount of phase rotation estimated based on the frequency domain received signal obtained after the MMSE combining performed once, to frequency domain received signals obtained before the MMSE combining, and
the MMSE combining processing unit computes an MMSE weight based on the frequency domain received signals to which is applied the reverse rotation of the amount of rotation corresponding to the amount of phase rotation estimated based on the frequency domain received signal obtained after the MMSE combining performed once, and performs MMSE combining.

3. The wireless communication apparatus according to claim 2, wherein a series of processes by the amount-of-phase-rotation estimating unit, the reverse rotation unit, and the MMSE combining processing unit are repeatedly performed.

4. A wireless communication apparatus including an MMSE combining processing unit that performs MMSE combining based on frequency domain received signals obtained by performing a discrete Fourier transform on received signals, the apparatus, comprising:
an amount-of-phase-rotation estimating unit that estimates an amount of phase rotation occurring in the frequency domain received signals due to a shift in discrete Fourier transform timing of the received signals using pilot signals included in only a minimum unit of resource allocation to a user in a multiple access scheme; and
a reverse rotation unit that applies a reverse rotation of an amount of rotation corresponding to the amount of phase rotation estimated by the amount-of-phase-rotation estimating unit, to the frequency domain received signals, wherein
the MMSE combining processing unit computes an MMSE weight based on the frequency domain received signals to which the reverse rotation has been applied by the reverse rotation unit, and performs MMSE combining, further including,
a replica generating unit that generates, based on a demodulated signal obtained by demodulating a data signal included in a frequency domain received signal obtained after MMSE combining performed once, a transmitted signal replica for the data signal, the transmitted signal replica being a replica of the minimum unit of the resource allocation to the user in the multiple access scheme, wherein
the amount-of-phase-rotation estimating unit is configured to estimate an amount of phase rotation based on a pilot signal and a frequency domain received signal for the pilot signal,
the amount-of-phase-rotation estimating unit is configured to further consider the transmitted signal replica as a pilot signal and thereby estimate an amount of phase rotation also using a frequency domain received signal for the data signal,
the reverse rotation unit is configured to apply a reverse rotation of an amount of rotation corresponding to the amount of phase rotation estimated also using the frequency domain received signal for the data signal, to frequency domain received signals obtained before the MMSE combining, and
the MMSE combining processing unit computes an MMSE weight based on the frequency domain received signals to which is applied the reverse rotation of the amount of rotation corresponding to the amount of phase rotation estimated also using the frequency domain received signal for the data signal, and performs MMSE combining.

5. The wireless communication apparatus according to claim 4, wherein the replica generating unit generates the transmitted signal replica for the data signal based on a signal obtained after performing error correction on the demodulated signal, the transmitted signal replica being the replica of the minimum unit of the resource allocation to the user.

6. The wireless communication apparatus according to claim 5, wherein the amount-of-phase-rotation estimating unit performs estimation of an amount of phase rotation, excluding a transmitted signal replica for a data signal whose error has not been able to be corrected or whose error has been detected, from transmitted signal replicas to be used for the estimation of an amount of phase rotation.

7. The wireless communication apparatus according to claim 4, wherein a series of processes by the replica generating unit, the amount-of-phase rotation estimating unit, the reverse rotation unit, and the MMSE combining processing unit are repeatedly performed.

* * * * *